United States Patent
Ni et al.

(10) Patent No.: US 11,416,126 B2
(45) Date of Patent: Aug. 16, 2022

(54) CONTROL METHOD AND APPARATUS

(71) Applicant: Huawei Technologies Co., Ltd., Shenzhen (CN)

(72) Inventors: Jing Ni, Beijing (CN); Kai Qian, Beijing (CN); Zhiyan Yang, Shenzhen (CN); Jingjin Xu, Shenzhen (CN); Shi Liu, Shenzhen (CN); Yuxiao Zhou, Shanghai (CN); Yonggang Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/956,663

(22) PCT Filed: Dec. 20, 2017

(86) PCT No.: PCT/CN2017/117585
§ 371 (c)(1),
(2) Date: Jun. 22, 2020

(87) PCT Pub. No.: WO2019/119325
PCT Pub. Date: Jun. 27, 2019

(65) Prior Publication Data
US 2020/0409520 A1  Dec. 31, 2020

(51) Int. Cl.
*G06F 3/0484* (2022.01)
*G06F 3/0482* (2013.01)
(Continued)

(52) U.S. Cl.
CPC ......... *G06F 3/0484* (2013.01); *G06F 3/0482* (2013.01); *G06F 3/0483* (2013.01);
(Continued)

(58) Field of Classification Search
CPC .... G06F 3/0484; G06F 3/0482; G06F 3/0483; G06F 3/04883; G06F 3/16;
(Continued)

(56) References Cited

U.S. PATENT DOCUMENTS 9,857,935 B2 * 1/2018 Jeong .................... G06F 3/0481
10,261,683 B2 * 4/2019 Han .................... G06F 3/04886
(Continued)

FOREIGN PATENT DOCUMENTS

CN 103533244 A 1/2014
CN 104281405 A 1/2015
(Continued)

*Primary Examiner* — Ryan F Pitaro
(74) *Attorney, Agent, or Firm* — Conley Rose, P.C.

(57) ABSTRACT

A control method includes displaying a first interface, receiving first input of a user acting on a non-navigation button, displaying, in response to the first input, at least one of an artificial intelligence (AI) function entry interface and a scene service task interface that are corresponding to the non-navigation button, where the first interface includes a navigation bar, the navigation bar is provided with a navigation button and at least one non-navigation button, when the navigation button is triggered, an electronic device performs at least one of returning to a previous interface, jumping to a home interface, and invoking an interface of an application program accessed within a preset time up to a current moment, and when the at least one non-navigation button is triggered, the electronic device displays at least one of an AI function entry interface and a scene service task interface.

20 Claims, 19 Drawing Sheets

(51) Int. Cl.
*G06N 20/00* (2019.01)
*G06F 3/0483* (2013.01)
*G06F 3/04883* (2022.01)
*G06F 3/16* (2006.01)

(52) U.S. Cl.
CPC ......... *G06F 3/04883* (2013.01); *G06N 20/00* (2019.01); *G06F 3/16* (2013.01)

(58) Field of Classification Search
CPC ............. G06F 3/04842; G06F 3/04817; G06F 3/04847; G06N 20/00
See application file for complete search history.

(56) References Cited

U.S. PATENT DOCUMENTS

| | | | |
|---|---|---|---|
| 10,382,383 B2* | 8/2019 | Iseminger | H04L 67/18 |
| D885,427 S * | 5/2020 | Elgena | D14/489 |
| 2003/0063128 A1* | 4/2003 | Salmimaa | H04M 1/7243 715/810 |
| 2009/0228820 A1* | 9/2009 | Kim | G06F 3/04817 715/769 |
| 2011/0087966 A1* | 4/2011 | Leviathan | G06F 16/9577 715/745 |
| 2011/0210922 A1* | 9/2011 | Griffin | G06F 1/1692 345/173 |
| 2013/0002568 A1* | 1/2013 | Selim | G06F 1/1643 345/173 |
| 2013/0117675 A1* | 5/2013 | Twig | G06F 3/048 715/737 |
| 2013/0254714 A1* | 9/2013 | Shin | G06F 3/0488 715/810 |
| 2015/0015500 A1* | 1/2015 | Lee | G06F 3/044 345/173 |
| 2015/0067579 A1* | 3/2015 | Jeong | G06F 3/0481 715/781 |
| 2015/0089407 A1* | 3/2015 | Suzuki | G06F 3/04817 715/763 |
| 2015/0100884 A1* | 4/2015 | Ryu | G09G 5/397 715/719 |
| 2015/0277702 A1* | 10/2015 | Hardwick | G06F 3/04842 715/835 |
| 2015/0310897 A1 | 10/2015 | Ko et al. | |
| 2015/0339007 A1 | 11/2015 | Yoshizawa et al. | |
| 2015/0382047 A1* | 12/2015 | Van Os | G10L 17/22 725/38 |
| 2016/0062552 A1* | 3/2016 | Jeong | G06F 3/0488 715/788 |
| 2016/0328143 A1* | 11/2016 | Hu | G06F 3/04883 |
| 2016/0360336 A1* | 12/2016 | Gross | H04M 1/72403 |
| 2016/0378281 A1* | 12/2016 | Sirpal | G06F 3/0488 715/779 |
| 2017/0149959 A1 | 5/2017 | Shin | |
| 2017/0277668 A1* | 9/2017 | Luo | G06F 16/345 |
| 2017/0351544 A1* | 12/2017 | Park | G06F 3/0488 |
| 2017/0364480 A1* | 12/2017 | Clinton | G06F 40/186 |
| 2018/0046625 A1 | 2/2018 | Liu et al. | |
| 2018/0136947 A1* | 5/2018 | Choi | H04M 1/72469 |
| 2018/0189099 A1* | 7/2018 | Meng | G06F 9/542 |
| 2018/0330732 A1* | 11/2018 | Dasgupta | G06F 3/165 |
| 2018/0341397 A1 | 11/2018 | Lu et al. | |
| 2019/0073100 A1* | 3/2019 | Li | G06F 3/04817 |
| 2019/0073124 A1* | 3/2019 | Li | G06F 3/04886 |
| 2019/0156071 A1* | 5/2019 | Kaladgi | H04M 1/72469 |
| 2019/0289128 A1* | 9/2019 | Baruah | G06F 9/451 |
| 2019/0342616 A1* | 11/2019 | Domm | G06F 16/9536 |
| 2019/0363875 A1* | 11/2019 | Iseminger | H04L 9/3236 |
| 2020/0204513 A1* | 6/2020 | Li | G06F 1/1626 |
| 2020/0210521 A1* | 7/2020 | Hutchins | G06F 3/0481 |

FOREIGN PATENT DOCUMENTS

| | | |
|---|---|---|
| CN | 104885044 A | 9/2015 |
| CN | 105005678 A | 10/2015 |
| CN | 106101544 A | 11/2016 |
| CN | 106293472 A | 1/2017 |
| CN | 106570102 A | 4/2017 |
| CN | 106605224 A | 4/2017 |
| CN | 107092471 A | 8/2017 |
| CN | 107132971 A | 9/2017 |
| CN | 107256109 A | 10/2017 |
| CN | 107305551 A | 10/2017 |
| CN | 107315820 A | 11/2017 |
| CN | 107450798 A | 12/2017 |

* cited by examiner

CONTROL METHOD AND APPARATUS

CROSS-REFERENCE TO RELATED APPLICATIONS

This application is a U.S. National Stage of International Patent Application No. PCT/CN2017/117585 filed on 20 Dec., 2017, which is hereby incorporated by reference in its entirety.

TECHNICAL FIELD

This application relates to the field of terminal technologies, and in particular, to a control method and apparatus.

BACKGROUND

With development of terminal technologies, especially development of artificial intelligence (AI) technologies, a user has an increasingly high requirement for an artificial intelligence function such as a voice input function. Currently, many terminals can implement the voice input function A mobile phone is used as an example. A user may find a setting icon on a home screen of the mobile phone, then tap the setting icon to enter a setting screen, find a control switch of the voice input function on the setting screen, and enable the voice input function. Then, the user can invoke functions such as making a call by entering a specified voice instruction. To reduce improper recognition of the voice instruction by the mobile phone, after completing use of the voice input function, the user may disable the voice input function in a same operation manner.

In the foregoing implementation, although artificial intelligence can be effectively implemented, from a user's perspective, search and tap operations affect user experience, and for a user unfamiliar with the foregoing operations, the foregoing operations are too complex and difficult to master.

SUMMARY

Embodiments of the present invention provide a control method and apparatus, to resolve a problem that operations are excessively complex in an invocation process of an artificial intelligence function such as a voice input function.

According to a first aspect, the embodiments of the present invention provide a control method executed by an electronic device. The method includes: displaying a first screen; receiving first input of a user acting on a non-navigation button; and displaying, in response to the first input, at least one of an AI function entry screen and a scene service task screen that are corresponding to the non-navigation button; where the first screen includes a navigation bar, the navigation bar is provided with a navigation button and at least one non-navigation button; when the navigation button is triggered, the electronic device performs at least one of returning to a previous screen, jumping to a home screen, and invoking a screen of an application program that is accessed within a preset time up to a current moment; and when the at least one non-navigation button is triggered, the electronic device displays at least one of an AI function entry screen and a scene service task screen. Compared with an implementation solution in the prior art in which a user needs to perform a plurality of operations to invoke a specific AI function, in the embodiments of the present invention, because the non-navigation button is disposed in the navigation bar, the user may trigger, by acting on the non-navigation button, displaying of the AI function entry screen and/or the scene service task screen. In this way, in many screens such as a home screen and an application running screen, the user usually can act on the non-navigation button in any application scene by using a global display function of the navigation bar, to reduce difficulty in invoking the AI function entry screen or the scene service task screen, so that a problem that operations are excessively complex in an invocation process of an artificial intelligence function such as a voice input function is resolved.

In a possible implementation, the at least one non-navigation button is one button. The displaying, in response to the first input; at least one of an AI function entry screen and a scene service task screen that are corresponding to the non-navigation button may be implemented as displaying, in response to the first input, the AI function entry screen and the scene service task screen that are corresponding to the non-navigation button. It can be learned that the user may perform different operations on the foregoing button, so that the AI function entry screen and the scene service task screen are separately displayed. Alternatively, the user may perform an operation on the foregoing button, so that the AI function entry screen and the scene service task screen are simultaneously displayed. That is, a single non-navigation button is provided for the user to invoke the foregoing two screens at a same moment, or invoke different screens at different moments by performing different operations on the single non-navigation button. It should be noted that, the disposing of the single non-navigation button further saves space in the navigation bar when the AI function entry screen and/or the scene service task screen can be invoked.

In a possible implementation, the at least one non-navigation button is two buttons. The receiving first input of the user acting on a non-navigation button; and displaying, in response to the first input, at least one of an AI function entry screen and a scene service task screen that are corresponding to the non-navigation button may be implemented as: receiving second input of the user acting on a first button, and displaying, in response to the second input, the AI function entry screen corresponding to the first button; and receiving third input of the user acting on a second button, and displaying, in response to the third input, the scene service task screen corresponding to the second button. The second input and the third input may be the same or different. For example, the foregoing second input and the third input include but are not limited to one of operations such as tapping, double tapping, touching and holding, sliding leftward, sliding rightward, pressing, and floating. In the embodiments of the present invention, an objective of disposing two non-navigation buttons is to enable the user to trigger different screen displays when acting on different non-navigation buttons.

In a possible implementation, the displaying, in response to the second input, the AI function entry screen corresponding to the first button may be implemented as: displaying, in response to the second input, the AI function entry, screen on the first screen in a floating manner. It can be learned that the AI function entry screen may be displayed in a floating manner. For example, a floating window is displayed on the first screen. In this way, from the user's perspective, the AI function entry screen covering the first screen is presented to the user without changing a layout of the currently displayed first screen, so that the user can conveniently invoke an AI function. In addition, content on the AI function entry screen is usually selectively recommended to the user based on content displayed on the first screen. Therefore, to help the user view the content presented on the AI function entry screen while viewing the first screen, the foregoing displaying in a floating manner is more convenient for the user to perform an operation. For example, the user may dynamically adjust a size and a location of a floating AI function entry screen, even adjust presentation transparency of the screen, or the like. This is not limited herein.

In a possible implementation, the displaying, in response to the third input, the scene service task screen corresponding to the second button may be implemented as: switching to display the scene service task screen on the first screen in response to the third input. The scene service task screen usually presents a relatively large amount of content, that is, a relatively large quantity of scene service tasks are recommended to the user. Therefore, to ensure clarity of displayed content, in the embodiments of the present invention, the first screen currently presented to the user may be switched to the scene service task screen in a screen switching manner, for the user to access.

In a possible implementation, the first screen is a first application screen. The displaying, in response to the second input, the AI function entry screen corresponding to the first button may be implemented as: displaying first recommended information on the first application screen in response to a received preset operation of the user on the first button on the navigation bar of the first application screen, where the first recommended information is determined by AI based on one or more display objects displayed on the first application screen, and the display object is at least one piece of text information, voice information, or image information.

In a possible implementation, the displaying first recommended information on the first application screen is specifically at least one of the following cases: displaying the first recommended information in an input box on the first application screen; displaying the first recommended information on the first application screen in a floating manner; and modifying the first application screen, and displaying the first recommended information on the modified first application screen. Using a message reply or interaction screen such as a chat screen as an example, the first recommended information is displayed in the input box of the first application screen, so that a time for editing reply content when the user replies to a message can be effectively reduced. For example, a mobile phone may extract one or more keywords from the currently displayed content in a processing manner such as a semantic analysis, and then match content in an existing database based on the extracted keyword, selectively recommend, to the user, one of a text, a voice, and an image that the user may expect to reply to a peer user. In this way, a time consumed by the user on editing reply content can be reduced. In addition, for a device such as a mobile phone with a relatively small input keyboard, frequency of using the input keyboard by the user is reduced. In addition, because an editing time of the user for editing the reply content is reduced, a waiting time of the peer user is also reduced. That is, for the peer user, a reply can be quickly received after a message is sent.

In a possible implementation, the first recommended information is at least one of a web address link, a text, a picture, or an emoticon. That is, using the foregoing chat screen as an example, the mobile phone can push types of recommended information to the user, so that the user can directly reply to the message.

In a possible implementation, the first recommended information is the web address link, and after the displaying the first recommended information on the first application screen, the foregoing method further includes: displaying, on the first application screen in response to a preset operation of the user on the web address link, content to which the web address link is directed. The user may perform the preset operation on the web address link, so that the content to which the web address link is directed can be presented in a current screen. For example, the user needs to implement content search. In such a quick prompt manner, the user does not need to exit a current display screen to enter an application program with a search function, and then perform a complex search operation, thereby bringing more convenient operation experience to the user.

In a possible implementation, the first application screen is a viewfinder screen. The first recommended information is information corresponding to the one or more display objects displayed on the first application screen, and the display object is the image information. For example, the user uses the mobile phone to photograph a surrounding environment. In a process of previewing an image and a video to be photographed, the mobile phone may automatically identify a current photographing as the viewfinder screen. In this case, a display object presented in the viewfinder screen may be used by the mobile phone to determine the first recommended information. The mobile phone may identify the display object by using functions such as screen recognition, and complete, based on a recognition result, functions such as searching and pushing related to the recognition result.

In a possible implementation, the AI function entry screen further includes at least one of voice search, image search, text search, and save function buttons.

In a possible implementation, the displaying, in response to the first input, an AI function entry screen corresponding to the non-navigation button may be implemented as: performing a semantic analysis on content on the first screen in response to the first input, extracting one or more keywords, and displaying the AI function entry screen including specific information. The specific information is information corresponding to the extracted keyword.

In a possible implementation, the scene service task screen includes: displaying a shortcut of a third application program at a first preset position on the scene service task screen at a first time, and displaying, on the scene service task screen in response to a received preset operation of the user on the shortcut of the third application program, a screen corresponding to the third application program; and displaying a shortcut of a fourth application program at the first preset position on the scene service task screen at a second time, and displaying, on the scene service task screen in response to a received preset operation of the user on the shortcut of the fourth application program, a screen corresponding to the fourth application program, where the third application program and the fourth application program are determined by the electronic device based on a use habit of the user. The first time is different from the second time, and the third application program is different from the fourth application program. It can be learned that at different time points, the scene service task screen may change more or less based on different scenes. Certainly, a prerequisite for updating the scene service task screen includes but is not limited to a time change, or may be a change of a location of a device, a change of a reminded event, or the like. This is not limited herein.

In a possible implementation, for a trigger button, namely, a second button, on the scene service task screen, content corresponding to the third application program is displayed on the second button at the first time; and content corresponding to the fourth application program is displayed on the second button at the second time. In other words, with a change of the scene service task screen, the second button also changes correspondingly, to more effectively prompt the user with content presented in the current scene service task screen.

In a possible implementation, the first screen is a home screen, the first screen further includes a dock area, and the dock area is used to hold a shortcut of an application program. In other words, the navigation bar and the dock area are two function areas that are separately located at different locations on the display screen. In the embodiments of the present invention, compared with the dock area, the navigation bar has a global display function.

According to a second aspect, the embodiments of the present invention provide a control apparatus. The apparatus can implement a function implemented in the foregoing method embodiments. The function may be implemented by hardware, or may be implemented by hardware executing corresponding software. The hardware or the software includes one or more modules corresponding to the foregoing functions.

According to a third aspect, the embodiments of the present invention provide a terminal. A structure of the terminal includes a display screen, a memory, one or more processors, a plurality of application programs, and one or more programs, where the one or more programs are stored in the memory, and when the one or more processors execute the one or more programs, the terminal is enabled to implement the method according to any one of the first aspect and possible designs of the first aspect.

According to a fourth aspect, the embodiments of the present invention provide a readable storage device, including an instruction. When the instruction runs on a terminal, the terminal is enabled to perform the method according to any one of the foregoing first aspect and possible designs of the first aspect.

According to a fifth aspect, the embodiments of the present invention provide a computer program product. The computer program product includes software code. The software code is used to perform the method according to any one of the foregoing first aspect and possible designs of the first aspect.

According to a sixth aspect, the embodiments of the present invention provide a graphical or user screen, configured to perform the method according to any one of the foregoing first aspect and possible designs of the first aspect.

DESCRIPTION OF REFERENCE NUMERALS

201—Status bar
202—System area
203—Dock area
204—Navigation bar
205—Page marker
206—Navigation button
207—Button used to trigger display of an AI function entry screen
208—Button used to trigger displaying of a scene service task screen
209—Floating window
210—Button used to trigger displaying of the AI function entry screen and the scene service task screen
211—Large card
212—Small card
213—Area in which a fixed AI function entry is located
214—Shortcut button of a scanning function
215—Shortcut button of a search function
216—Shortcut button of a voice input function
217—Location information
218—Scroll bar

DESCRIPTION OF EMBODIMENTS

Figure 1:
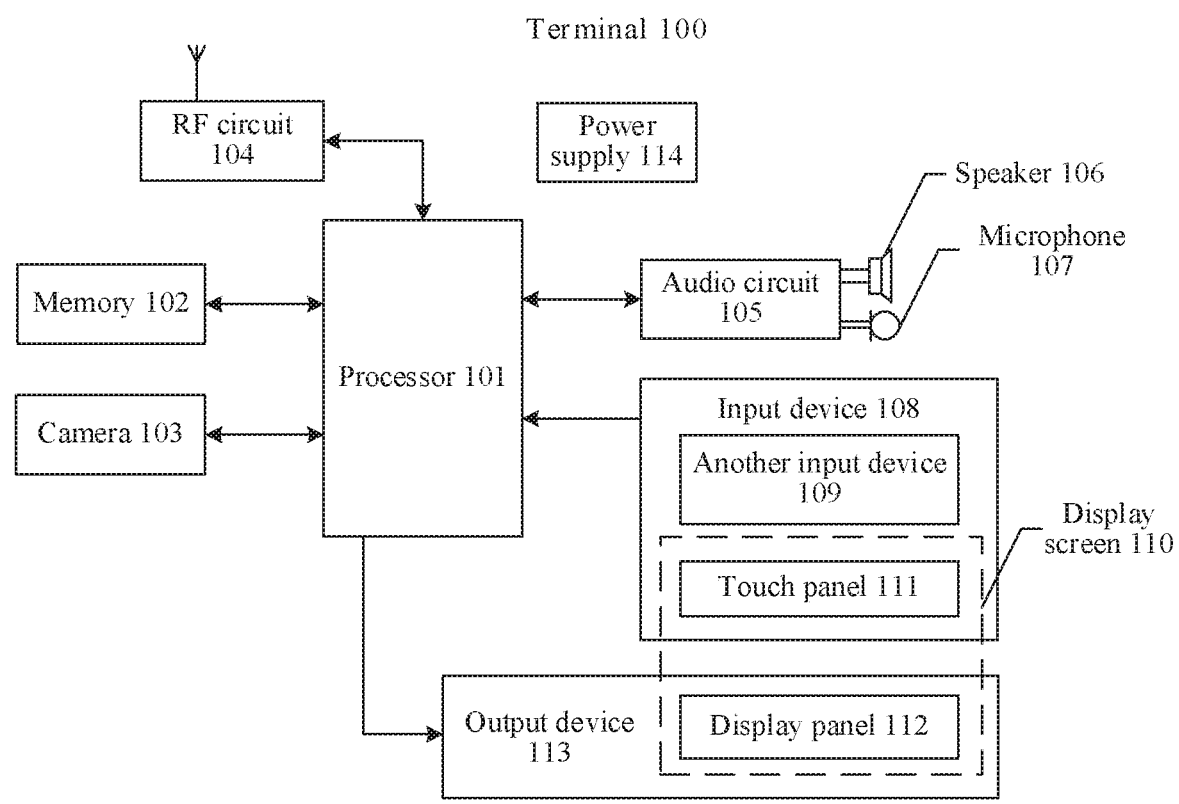
FIG. 1 is a first schematic structural diagram of a terminal according to an embodiment of the present invention.

The embodiments of the present invention may be applied to a terminal (that is, an electronic device). The terminal may be a device such as a laptop computer, a smartphone, a virtual reality (Virtual Reality, VR) device, an augmented reality (Augmented Reality, AR) technology, an in-vehicle device, or an intelligent wearable device. The terminal may be at least provided with a display screen, an input device, and a processor. The terminal 100 is used as an example. As shown in FIG. 1, the terminal 100 includes components such as a processor 101, a memory 102, a camera 103, an RF circuit 104, an audio circuit 105, a speaker 106, a microphone 107, an input device 108, another input device 109, a display screen 110, a touch panel 111, a display panel 112, an output device 113, and a power supply 114. The display screen 110 includes at least the touch panel 111 used as an input device and the display panel 112 used as an output device. It should be noted that the structure of the terminal shown in FIG. 1 does not constitute a limitation to the terminal, and the terminal may include more or fewer components than those shown in the figure, or some components may be combined, or some components may be separated, or a different component deployment may be used. This is not limited herein.

The following describes each composition component of the terminal 100 in detail with reference to FIG. 1.

The radio frequency (Radio Frequency, RF) circuit 104 may be configured to receive and send information or receive and send a signal in a call process. For example, if the terminal 100 is a mobile phone, the terminal 100 may receive, by using the RF circuit 104, downlink information sent by a base station, and then the RF circuit 104 transmits the downlink information to the processor 101 for processing. In addition, the terminal 100 sends relevant uplink data to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 104 may further communicate with a network and another device through wireless communication. The wireless communication may use any communications standard or protocol, including but not limited to a global system of mobile communication (Global System of Mobile communication, GSM), a general packet radio service (General packet Radio Service, GPRS), code division multiple access (Code Division Multiple Access, CDMA), and wideband code division multiple access (Wideband Code Division Multiple Access, WCDMA), long term evolution (Long Term Evolution. LTE), email, short message service (Short Messaging Service, SMS), and the like.

The memory 102 may be configured to store a software program and a module. The processor 101 runs the software program and the module that are stored in the memory 102, to perform function applications and data processing that are of the terminal 100. The memory 102 may mainly include a program storage area and a data storage area. The program storage area may store an operating system, an application program required by at least one function (for example, an audio playing function or an image playing function), and the like. The data storage area may store data (for example, audio data or video data) created based on use of the terminal 100. In addition, the memory 102 may include a high-speed random access memory, and may further include a non-volatile memory, for example, at least one magnetic disk storage device, a flash memory device, or another volatile solid-state storage device.

The another input device 109 may be configured to: receive input digit or character information, and generate key signal input related to user setting and function control that are of the terminal 100. Specifically, the another input device 109 may include but is not limited to one or more of a physical keyboard, a function key (for example, a volume control key or an on/off key), a trackball, a mouse, a joystick, and an optical mouse (the optical mouse is a touch-sensitive surface that does not display visual output, or an extension of a touch-sensitive surface formed by a touchscreen), or the like. The another input device 109 may further include a sensor built in the terminal 100, such as a gravity sensor or an acceleration sensor, and the terminal 100 may further use a parameter detected by the sensor as input data.

The display screen 110 may be configured to display information entered by a user or information provided for the user, and menus of the terminal 100, and may further receive user input. In addition, the display panel 112 may be configured in a form of a liquid crystal display (Liquid Crystal Display, LCD), an organic light-emitting diode (Organic Light-Emitting Diode, OLED), or the like. The touch panel 111, also referred to as a touchscreen, a touch-sensitive screen, or the like, may collect a touch or non-touch operation (for example, an operation performed by the user on the touch panel 111 or near the touch panel 111 by using any proper object or accessory, such as a finger or a stylus, or a motion sensing operation may be included, and the operation includes an operation type such as a single-point control operation or a multipoint control operation) performed by the user on or near the touch panel 111, and drive a corresponding connection apparatus based on a preset program. It should be noted that the touch panel 111 may further include two parts: a touch detection apparatus and a touch controller. The touch detection apparatus detects a touch orientation and gesture of the user, detects a signal generated by the touch operation, and sends the signal to the touch controller. The touch controller receives touch information from the touch detection apparatus, converts the touch information into information that can be processed by the processor 101, and then sends the information to the processor 101. In addition, the touch controller can further receive and execute a command sent by the processor 101. In addition, the touch panel 111 may be implemented in a plurality of types, such as a resistive type, a capacitive type, an infrared ray, and a surface acoustic wave, or the touch panel 111 may be implemented by using any future technology. Generally, the touch panel 111 may cover the display panel 112. The user may perform an operation, according to content (the displayed content includes but is not limited to a soft keyboard, a virtual mouse, a virtual button, an icon, or the like) displayed on the display panel 112, on or near the touch panel 111 covered by the display panel 112. After detecting the operation on or near the touch panel 111, the touch panel 111 transfers the operation to the processor 101 to determine a user input. Then, the processor 101 provides a corresponding visual output on the display panel 112 according to the user input. Although in FIG. 1, the touch panel 111 and the display panel 112 are used as two separate parts to implement input and output functions of the terminal 100, in some embodiments, the touch panel Ill and the display panel 112 may be integrated to implement the input and output functions of the terminal 100.

The RF circuit 104, the speaker 106, and the microphone 107 may provide audio interfaces between the user and the terminal 100. The audio circuit 105 may convert received audio data into a signal and transmit the signal to the speaker 106. The speaker 106 converts the signal into a sound signal for output. In addition, the microphone 107 may convert a collected sound signal into a signal. The audio circuit 105 receives the signal and converts the signal into audio data, and outputs the audio data to the RF circuit 104 to send the audio data to a device such as another terminal, or outputs the audio data to the memory 102, so that the processor 101 further processes the audio data based on content stored in the memory 102. In addition, the camera 103 may collect an image frame in real time, sends the image frame to the processor 101 for processing, and stores a processed result to the memory 102 and/or presents, to the user, a processed result by using the display panel 112.

The processor 101 is a control center of the terminal 100, and is connected to parts of the terminal 100 by using interfaces and lines. By running or executing the software program and/or the module stored in the memory 102, and invoking data stored in the memory 102, the processor 101 performs functions and data processing of the terminal 100, to perform overall monitoring on the terminal 100. It should be noted that the processor 101 may include one or more processing units. The processor 101 may be further integrated with an application processor and a modem processor. The application processor mainly processes an operating system, a user interface (User Interface, UI), an application program, and the like. The modem processor mainly processes wireless communication. It may be understood that the foregoing modem may alternatively not be integrated into the processor 101.

The terminal 100 may further include the power supply 114 (for example, a battery) that supplies power to each component. In this embodiment of the present invention, the power supply 114 may be logically connected to the processor 101 by using a power management system, to manage functions such as charging, discharging, and power consumption by using the power management system.

In addition, there are also components not shown in FIG. 1. For example, the terminal 100 may further include a Bluetooth module, a sensor, and the like. Details are not described herein.

The following describes the technical solutions provided in the embodiments of the present invention by using an example in which the terminal 100 is a mobile phone.

Figure 2A:
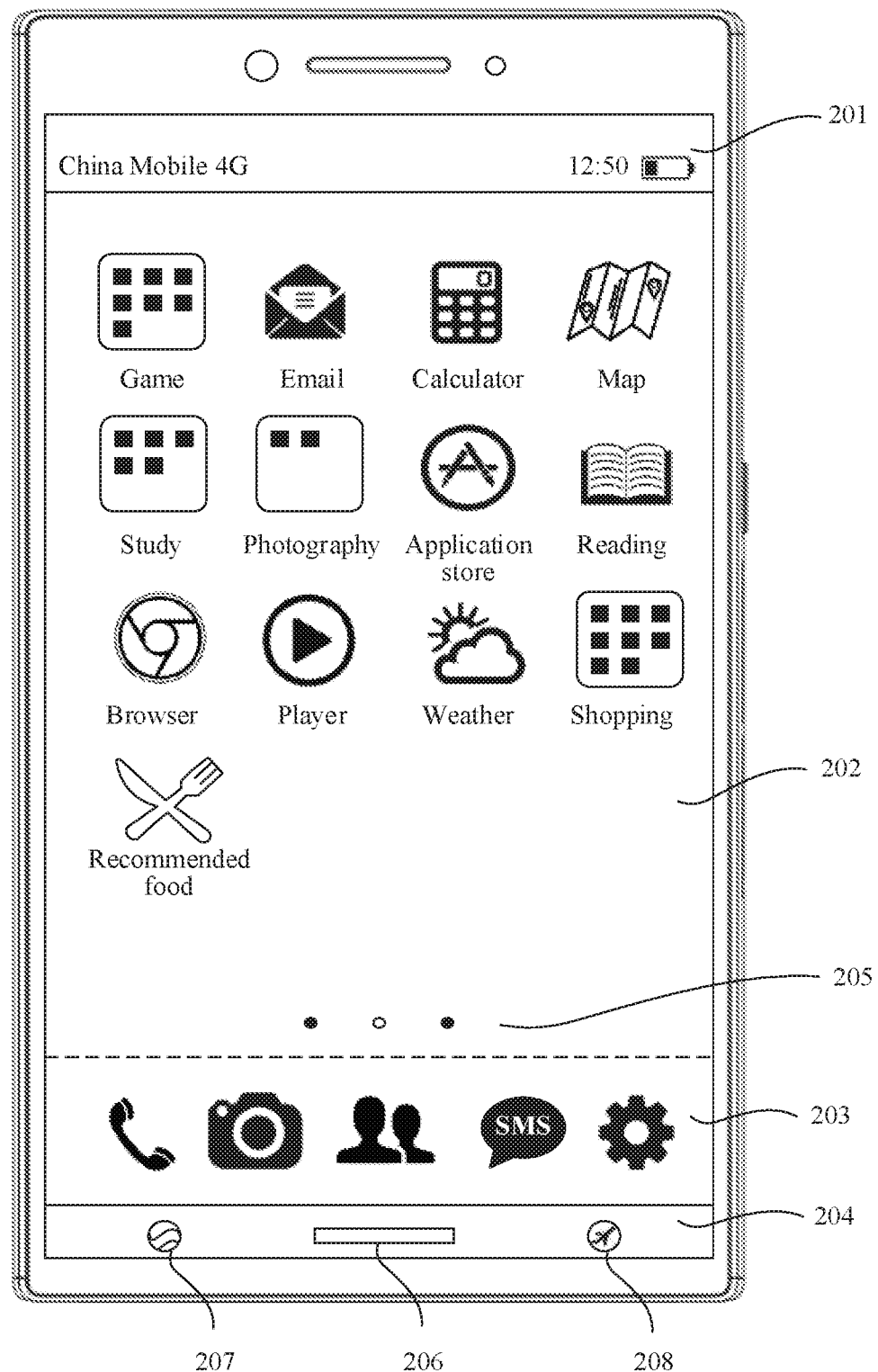
FIG. 2(a) is a first schematic diagram of a display screen according to an embodiment of the present invention.

The mobile phone shown in FIG. 2(a) is used as an example. A display screen of the mobile phone includes a status bar 201, a system area 202, a dock area 203, and a navigation bar 204. A page marker 205 is located in the system area 202. The navigation bar 204 includes a navigation button 206, a button 207, that is, a first button, used to trigger displaying of an AI function entry screen, and a button 208, that is, a second button, used to trigger displaying of a scene service task screen. The button 207 and the button 208 may be considered as a possible implementation form of a non-navigation button. In addition, the button 210 mentioned below used to trigger displaying of the AI function entry screen and the scene service task screen may further be considered as a possible implementation form of the non-navigation button.

In this embodiment of the present invention, the system area 202 is configured to display an icon of an application program already installed on the mobile phone, and a folder. The dock area 203 is used to display an application program icon that the user expects to view on each home screen. The navigation bar 204 may usually be displayed on any display screen. To be specific, when accessing any screen, the user may see the navigation bar 204 in the screen being accessed, and trigger a button on the navigation bar 204, so that the mobile phone performs a corresponding function. For example, the user may trigger, by tapping the navigation button 206, the mobile phone to return from a current display screen to a previous screen, or trigger, by touching and holding the navigation button, the mobile phone to present a home screen, or trigger, by sliding leftward or rightward in an area in which the navigation button is located, the mobile phone to present a recently accessed application program, or the like. Alternatively, the navigation button 206 may be three navigation buttons, respectively corresponding to returning to the previous screen, returning to the home screen, and displaying the recently accessed application program. Alternatively, the navigation button 206 may be two navigation buttons, and the foregoing three functions are separately implemented by using different operations, for example, a tap, a double-tap, a touch and hold or pressing operation, and a floating operation. The recently accessed application program refers to an application program accessed within a preset time up to a current moment, or may be understood as all application programs running in the foreground and the background up to the current moment after the mobile phone power-on last time, that is, after the current mobile phone power-on. The three functions corresponding to the navigation button are in the prior art, and details are not described herein.

Because the button 207 and the button 208 are disposed in the navigation bar 204, the button 207 and the button 208 are similar to the navigation button 206 and both have a global display function. That is, regardless of a display screen currently opened on the mobile phone, provided that the navigation bar 204 exists on the display screen, the button 207 and the button 208 are simultaneously displayed with the navigation button 206. Alternatively, it may be understood that even if the navigation button 206 is hidden, the button 207 and the button 208 may be displayed provided that the navigation bar 204 can be displayed on the display screen.

It should be noted that, in this embodiment of the present invention, an example in which the navigation bar 204 includes a single navigation button, that is, a navigation button 206 that can trigger multiple functions is used to describe this embodiment of the present invention. However, the technical solution used in this embodiment of the present invention may alternatively be applicable to a navigation bar set in another manner. For example, the navigation bar includes three or two buttons.

Considering a setting manner of the navigation button 206 shown in FIG. 2(a), space in the navigation bar 204 can be effectively saved, so that the navigation bar 204 has sufficient space for holding another button. For example, in an idle area of the navigation bar 204, the button 207 used to trigger displaying of the AI function entry screen and the button 208 used to trigger displaying of the scene service task screen may be set.

As shown in FIG. 2(a), in the navigation bar 204, the button 207 and the button 208 are separately located on two sides of the navigation button 206, to make full use of an idle area of the navigation bar 204. For example, the button 207 is located on a left side of the navigation button 206, and the button 208 is located on a right side of the navigation button 206. In this embodiment of the present invention, positions of the button 207 and the button 208 are not limited. For example, when the two buttons are separately located on two sides of the navigation button 206, a setting manner shown in FIG. 2(b) may be further implemented. That is, the button 207 is located on a right side of the navigation button 206, and the button 208 is located on a left side of the navigation button 206.

For ease of use by the user, after the user acts on the button 207, the mobile phone may present, to the user, an AI function entry screen including one or more AI function entries. That is, the user may enable a button in the navigation bar in operation manners such as tapping, double tapping, sliding (that is, sliding leftward, sliding rightward, sliding upward, sliding downward, or the like), pressing, touching and holding, a large-area gesture, and floating touch. Similarly, after the user acts on the button 208, the mobile phone may present, to the user, a scene service task including one or more scene service tasks for the user to access. That is, in this embodiment of the present invention, second input of the user acting on the button 207 and third input of the user acting on the button 208 may be the same or different.

Considering that among AI functions, the user may prefer to use a particular AI function, for example, one of a scanning function, a search function, and a voice input function. The AI functions listed above are frequently used or highly practical AI functions. Certainly, a particular AI function mentioned above is not limited to one of the listed functions, and may alternatively be another AI function considered by the user to be relatively common. The AI functions may be set according to factory default settings, or may be implemented or changed according to user settings, or may be determined by analyzing a use habit of the user, or the like. This is not limited herein.

Figure 3A:
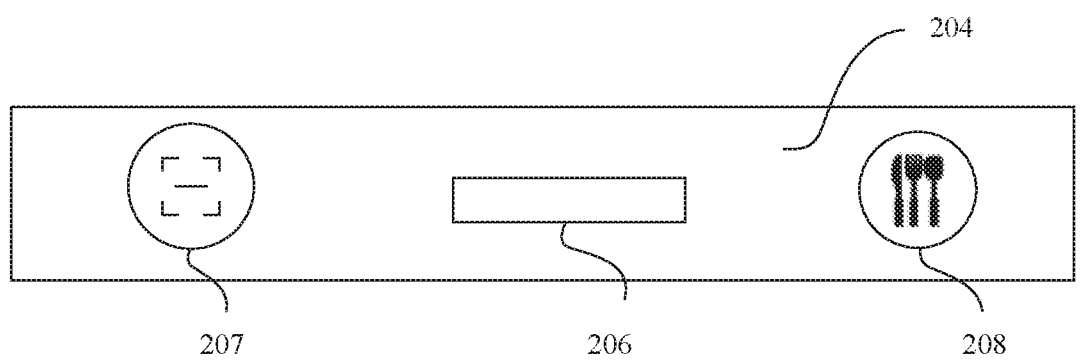
FIG. 3(a) is a first schematic diagram of a navigation bar according to an embodiment of the present invention.

In this case, the button 207 may provide the user with one-tap access to a single AI function, for example, as shown in FIG. 3(*a*) and FIG. 3(*b*). The button 207 is displayed as an icon of the scanning function, so that the user can more intuitively learn of an AI function that can be triggered after acting on the button 207. After the user acts on the button 207, as shown in FIG. 3(*b*), a floating window 209 may be displayed on the mobile phone, to present an operation screen of the scanning function to the user. In this case, the user may directly use the mobile phone to complete, scanning of a code (a two-dimensional code, a bar code, or the like) and identification of the code. In other words, the user invokes the scanning function by using one operation acting on the button 207, to facilitate a user operation.

For another example, as shown in FIG. 4(*a*) and FIG. 4(*b*), the user may invoke the search function by using an operation acting on the button 207.

For another example, as shown in FIG. 5(*a*) and FIG. 5(*b*), the user may invoke the voice input function by using an operation acting on the button 207.

From the user's perspective, each of the foregoing several possible setting manners of the button 207 can enable the user to more intuitively learn that an AI function that can be triggered by using the button 207. In this case, the user may conveniently and quickly invoke, based on a requirement of the user, an AI function corresponding to the button 207.

It should be noted that a function that can be implemented by using the button 207 may be preset by the user, or may be set in the mobile phone before delivery. A specific setting manner is proposed in the following, and details are not described herein.

Considering that the button 208 is used to trigger a scene service task, and the scene service task may change with a scene, in this embodiment of the present invention, there is a high probability that no matched scene service task exists in a current scene. In this case, when the user taps the button 208, there is a high probability that a blank screen is invoked or no screen is invoked. A matching rule between the current scene and the scene service task includes but is not limited to: when the user selects one or more of the plurality of scenes provided by the mobile phone, when one or more preset parameters of the mobile phone meet a preset scene (condition), or when a user operation meets a preset condition, that the mobile phone may automatically display a corresponding scene icon, to prompt the user with a scene service task available to the current scene, or provide the user with information related to the current scene.

To avoid the foregoing case of invoking an invalid screen, in this embodiment of the present invention, when the button 208 does not have a corresponding screen, or it is understood that when a screen corresponding to the button 208 is a blank screen, the button 208 may not be presented to the user in the navigation bar 204. In this case, it may be considered that the button 208 is hidden, or the button 208 does not exist in the navigation bar 204. In this way, the user will not invoke the invalid screen by acting on the button 208. That the button 208 is hidden may be understood as that the user may invoke the button 208 in the navigation bar 204 in a setting manner, or the button 208 may be automatically displayed in the navigation bar 204 when the button 208 has a corresponding non-blank screen. This is not limited herein.

It should be noted that, to more intuitively present, to the user, a presentation effect obtained after the user acts on the button 208, in this embodiment of the present invention, the button 208 selectively presents content of the scene service task to the user. For example, the scene service task includes but is not limited to one or more of a flight, a train, a hotel, a destination friend, a destination recommendation, a rest reminder, a conference, express delivery, fitness and health, a data traffic report, and a mobile phone use status.

For example, as shown in FIG. 2(*a*), when being presented, the button 208 is displayed as an icon including an airplane graphic. In this case, the user may intuitively learn that there is a task related to flight or travel currently, or the user is in a flight-related scene currently, and after acting on the button 208, the user can obtain a scene service task related to an air ticket. The scene service task related to the air ticket may present, to the user, at least one piece of information such as a flight departure time, an arrival time, a departure place, a destination, airport information, flight duration, a mileage, and a traffic condition to the airport, that corresponds to the purchased air ticket, may further selectively push, to the user based on a current location of the user, an appropriate travel route, a proper travel manner, and the like for arriving at the airport, and certainly, may further be associated with an existing application program in the mobile phone if permitted by the user, to provide the user with convenient services such as car hailing, hotel reservation, and destination contact information recommendation.

For another example, as shown in FIG. 2(*b*), when being presented, the button 208 is displayed as an icon including a weather graphic. In this case, the user may intuitively learn that after acting on the button 208, the user can obtain a scene service task related to a weather condition. The scene service task related to the weather condition may present, to the user, at least one piece of information such as a current temperature, an inhalable particulate matter proportion, and a possible temperature change status in a next period of time, may further selectively recommend a clothing type suitable for a current weather condition to the user based on a parameter such as a user's somatosensory temperature collected by another device associated with the mobile phone, for example, a band, and certainly, may further be associated with an existing application program in the mobile phone if permitted by the user, to provide the user with convenient services such as turning on an air purifier and an air conditioner in the room.

For another example, as shown in FIG. 3(*a*), when being presented, the button 208 is displayed as an icon including a tableware graphic. In this case, the user may intuitively learn that after acting on the button 208, the user can obtain a scene service task related to the diet. The diet-related scene service task may present, to the user, at least one piece of information such as a nearby place providing diet, consumption level, and recommended dish, may further selectively push, to the user based on a current location of the user, an available route and a travel manner that are suitable for arriving at the place, certainly, may further be associated with an existing application program in the mobile phone if permitted by the user, to push a service such as group buying or preferential buying to the user, and may further provide information such as a parking lot or a gas station near a restaurant for the user based on obtained current movement information of the user.

Figure 4A:
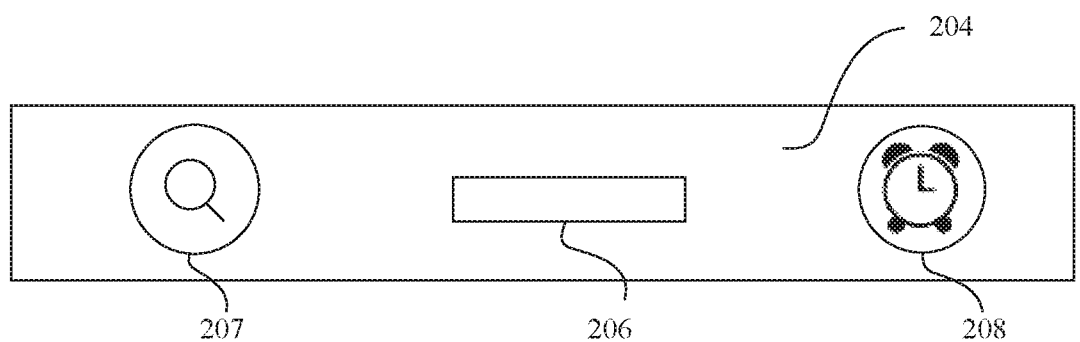
FIG. 4(a) is a second schematic diagram of a navigation bar according to an embodiment of the present invention.
Figure 5A:
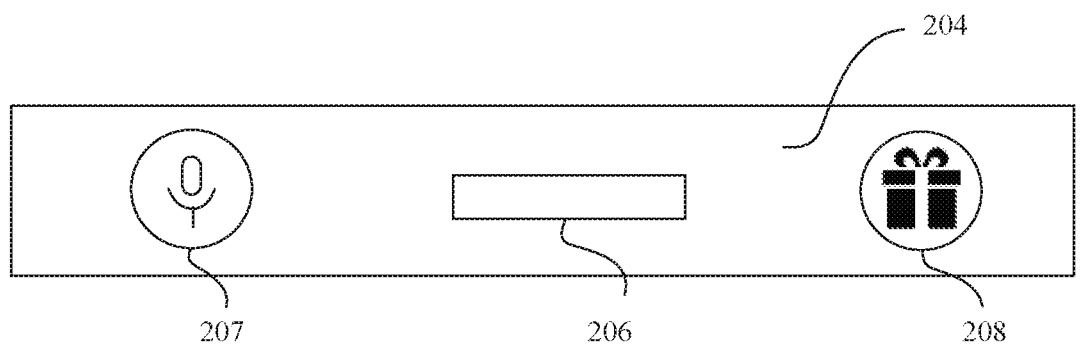
FIG. 5(a) is a third schematic diagram of a navigation bar according to an embodiment of the present invention.

For another example, as shown in FIG. 4(a), when being presented, the button 208 is displayed as an icon including an alarm clock graphic. In this case, the user may intuitively learn that after acting on the button 208, the user can obtain a scene service task related to a schedule arrangement and a reminded event. The scene service task related to the schedule arrangement and the reminded event may present, to the user, a schedule arrangement and a reminded event whose occurrence time has not been reached today. Similarly, the scene service task may further selectively push, to the user based on a current location of the user, an appropriate arrival schedule arrangement, a route, a travel manner, weather forecast, and the like that can be used for a destination of the reminded event For another example, as shown in FIG. 5(a), when being presented, the button 208 is displayed as an icon including a gift graphic. In this case, the user may intuitively learn that after acting on the button 208, the user can obtain a scene service task related to shopping. The scene service task related to shopping may present, to the user, at least one piece of information such as a shopping website, a link to an Internet celebrity-backed product, a currently popular product that the user probably needs to purchase, and a preference condition of a product that the user adds to the wish list.

It should be noted that each of the foregoing implementations is used as a possible case, and is not intended to limit the embodiments of the present invention. It can be learned that the button 208 may change with a scene, so that a user can more intuitively learn of a type of a scene service task that the user can obtain after the user acts on the button 208. An icon of the button 208 may be preset by the user. For example, the mobile phone provides a plurality of icon options for the user, and the user presets corresponding icons for different types of scene service tasks. In this way, after viewing the icons, the user can learn of content of the scene service tasks that the mobile phone currently attempts to recommend to the user. Alternatively, reference is made to icons used when application programs are classified on a platform, such as an application store, for the user to download and update the application programs having different functions, and such icons that are recognized and commonly known by most users are used as icons for identifying different scene service tasks, so that most users can intuitively learn of the content of the scene service task that the mobile phone attempts to recommend to the user Similarly, a presentation form of the button 207 may further change with a current scene, and is not limited to presenting an icon indicating a single AI function only when the single AI function is triggered. This means that even if after acting on the button 207, the user obtains a plurality of AI function entries, the presentation form of the button 207 may still be diversified. A presentation form, a change occurrence occasion, a change triggering condition, and the like of the button 207 and the button 208 are not limited herein. The foregoing scene includes but is not limited to content presented on a current display screen of the mobile phone, and may further include an application to which the current screen belongs, a current location of the user, a current time, a current user status, and the like. This is not limited herein. The content presented on the current display screen of the mobile phone may be identified in a manner such as screen recognition. The application to which the current screen belongs may be obtained from application attribute information or obtained through network query. The current location of the user may be identified in a manner such as a positioning function of the mobile phone. The current time may be obtained from a time that changes in real time and that is presented by a clock of the mobile phone. The current user status may be obtained by using an application program that is in the mobile phone and that is used to monitor a user health status, or may be determined by using a parameter detected by a wearable device such as a band, or the like. This is not limited herein.

For the button 208, if there are at least two types of scene service tasks, the icon of the button 208 may present, to the user based on priorities corresponding to the types of the scene service tasks, an icon corresponding to a scene service task with a highest priority. Priorities of different types of scene service tasks may be preset by the user, or may be set according to use habits of most users when the mobile phone is delivered from a factory, and a function of modifying the foregoing priorities may be selectively provided for the user, to provide a more user-friendly service for the user.

Certainly, the mobile phone may further present, to the user at the same time, icons respectively corresponding to the at least two types. A presentation form includes but is not limited to displaying of at least two icons in an overlapping manner, displaying of at least two icons in an alternating manner.

Two icons are used as an example. If the two icons are displayed in an overlapping manner, two different layers may be set for the two icons. For example, one icon is displayed at a first layer, and the other icon is displayed at a second layer. To present a clearer display effect to the user, the two icons may be set to have different colors with a relatively large contrast, or the two icons are displayed with a specific transparency. This is not limited herein. In addition, the two icons may alternatively be displayed in a partially overlapping manner. To be specific, a second half of an icon partially overlaps a first half of another icon. For example, one icon is displayed, and the other icon is located at the second layer and below the first layer at which the one icon is located. That is, the other icon displays a part that is not covered by the one icon.

If the two icons are displayed in an alternating manner, duration in which the icons are displayed in an alternating manner may be preset, that is, duration in which the icons are displayed for a single time may be set to be different, or duration in which the two icons are displayed for a single time is set to be the same. This is not limited herein. That is, the first icon is displayed in a period of time, the second icon is displayed in another adjacent period of time, then the first icon is displayed, and so on, to implement the displaying in an alternating manner. It should be noted that duration in which each icon is displayed for a single time may be set based on a priority of a scene service task corresponding to the icon, and the priority may be preset by the user based on a historical empirical value or subjective awareness of the user. This is not limited herein.

In the foregoing example, the button 207 and the button 208 that are located in the navigation bar 204 each correspond to one function. That is, if attempting to invoke the functions respectively corresponding to the button 207 and the button 208, the user needs to separately perform operations on the button 207 and the button 208.

Figure 6A:
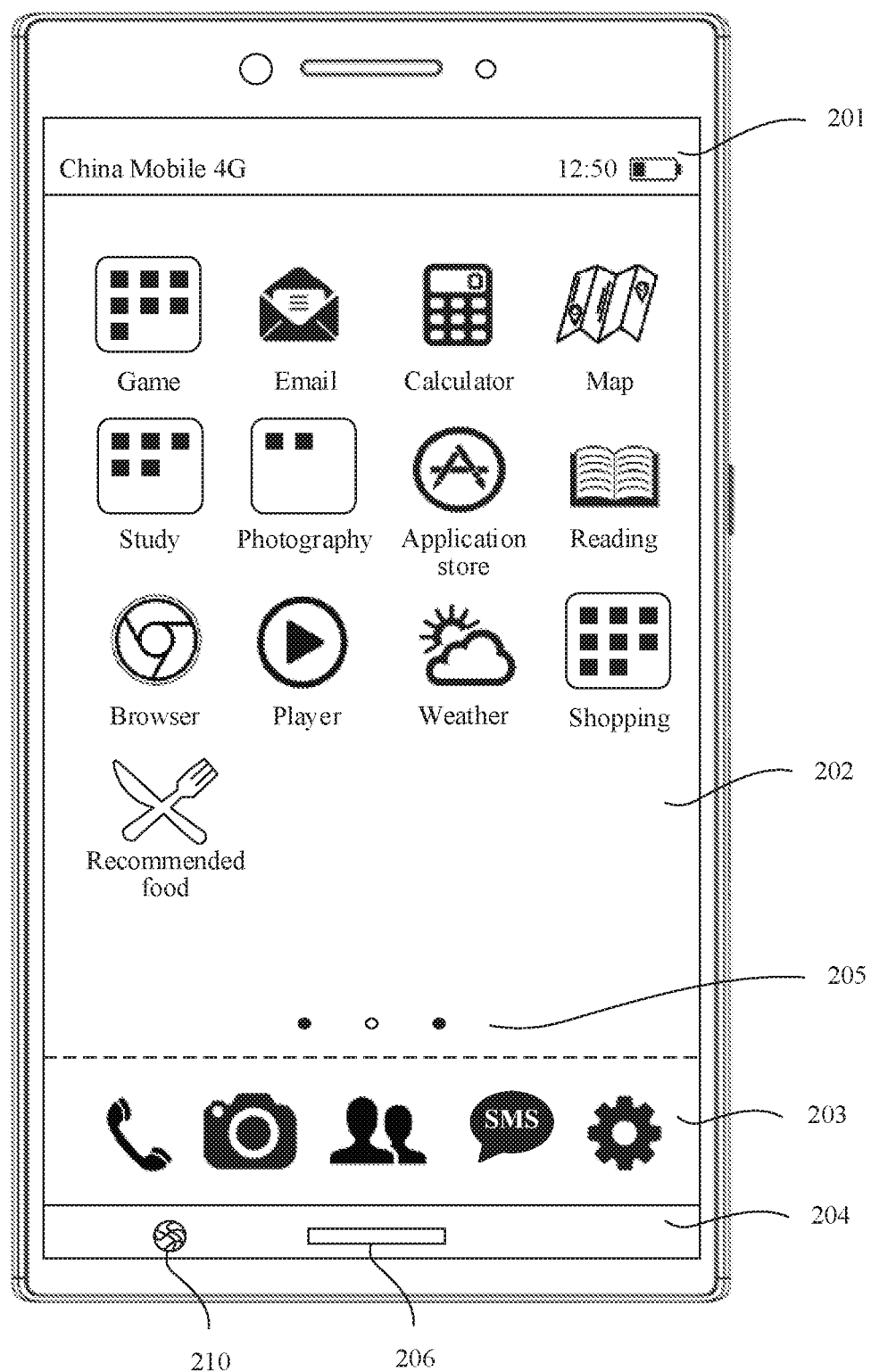
FIG. 6(a) is a sixth schematic diagram of a display screen according to an embodiment of the present invention.
Figure 6B:
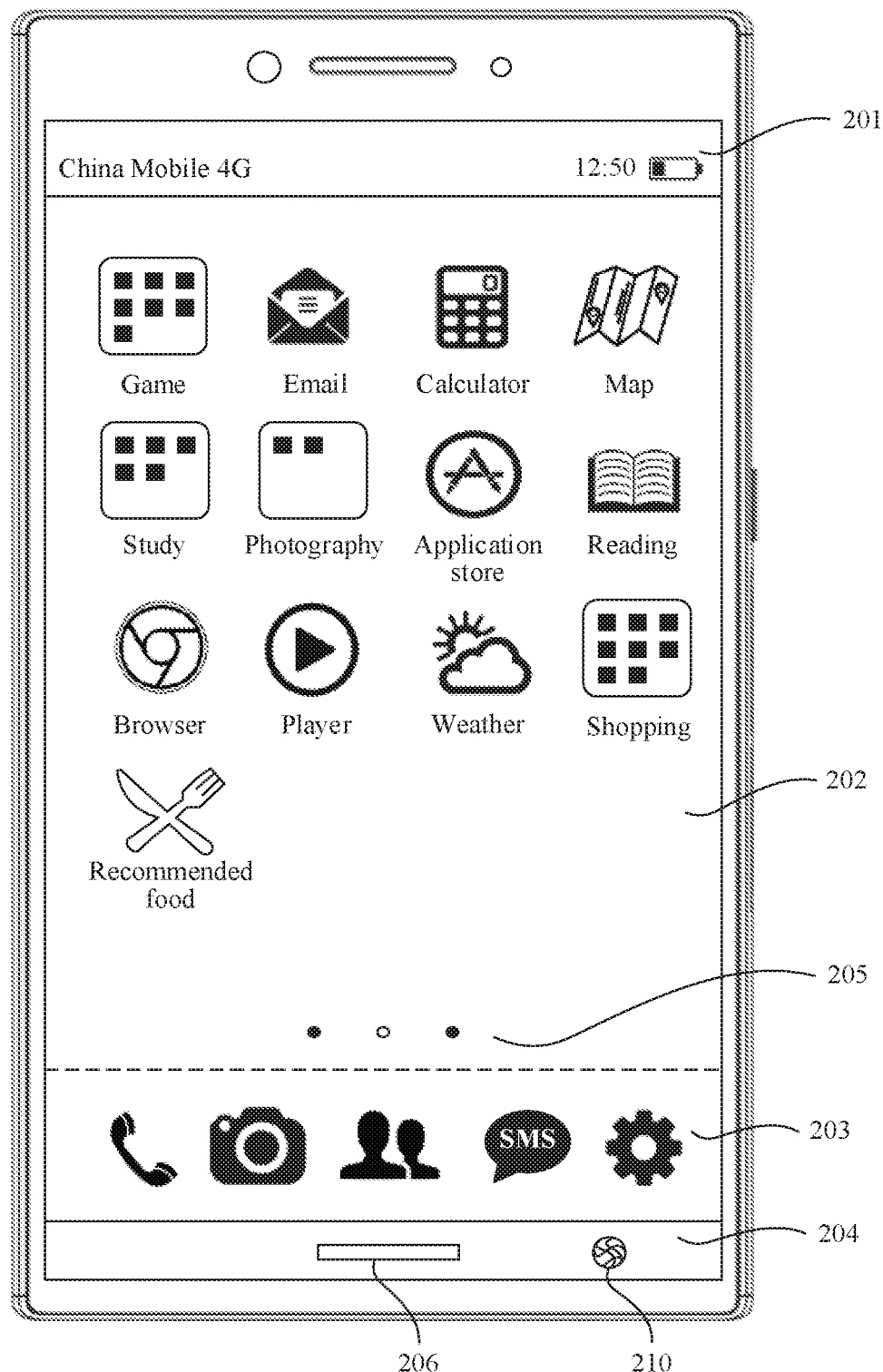
FIG. 6(b) is a seventh schematic diagram of a display screen according to an embodiment of the present invention.

To further simplify an operation of the user and save occupied space in the navigation bar 204, in a possible implementation, the button 207 used to trigger displaying of the AI function entry screen may be integrated with the button 208 used to trigger displaying of the scene service task screen. To be specific, a button 210 used to trigger displaying of the AI function entry screen and the scene service task screen is disposed, as shown in FIG. 6(a) or FIG. 6(b). Certainly, only one of the buttons 207 and 208 may be disposed on the navigation bar.

A setting manner of the button 210 is similar to that of the button 207 and the button 208. For details, refer to the foregoing descriptions of the button 207 and the button 208. Details are not described herein again. Similarly, input acting on the button 210 is similar to the foregoing second input and third input, and details are not described herein again. It should be noted that, after acting on the button 210, the user may invoke the AI function entry screen and the scene service task screen. Similarly, the button 210 may further be presented in a form such as the foregoing variable icon. For a specific implementation, refer to the foregoing description. Details are not described herein again.

In this embodiment of the present invention, regardless of the button 207, the button 208, or the button 210, considering that the navigation bar 204 occupies relatively small space of the display screen, the foregoing buttons may be presented in a form of small icons during setting. That is, icons of the foregoing buttons are smaller than icons and folders of application programs presented in the system area 202, and certainly, are also smaller than icons of shortcuts of application programs in the dock area. In other words, the foregoing buttons are disposed in a design manner of small icons, so that space on the display screen can be effectively saved. Certainly, the buttons in the navigation bar may alternatively be displayed in a normal icon size. Icon sizes may alternatively be different. This is not limited in the present invention. For this embodiment of the present invention, the navigation bar 204 exists on the display screen, and the foregoing buttons are disposed in the navigation bar 204, and do not occupy display space other than the navigation bar 204 on the display screen. Especially for a full-screen mobile phone, a display screen can be more fully used, so that a more convenient operation manner is provided for the user when no extra display space is occupied.

Figure 2B:
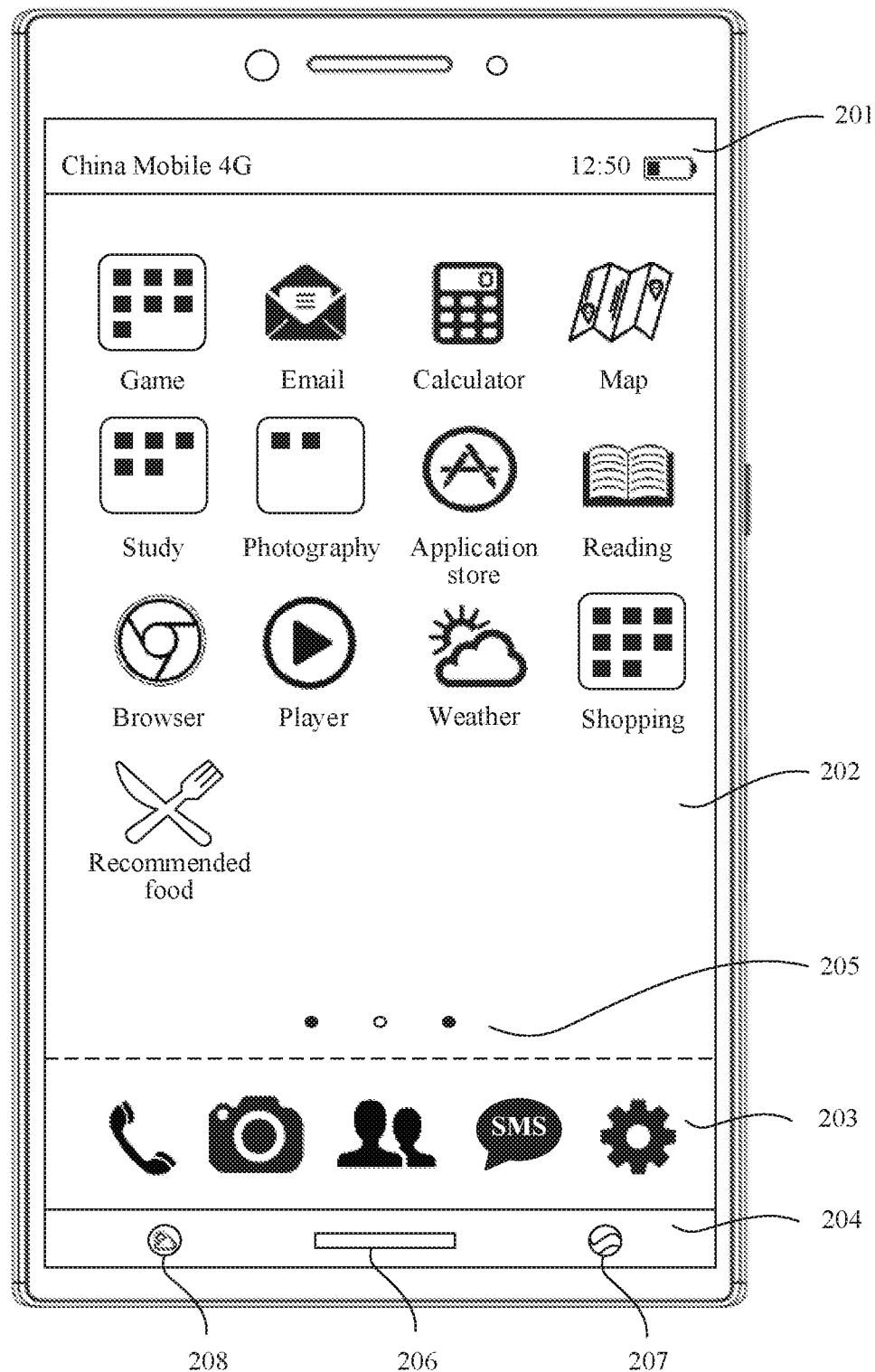
FIG. 2(b) is a second schematic diagram of a display screen according to an embodiment of the present invention.

The case shown in FIG. 2(a) or FIG. 2(b) is used as an example. The user may act on the button 207 or the button 208 in a manner such as tapping, double-tapping, or touching and holding, to trigger the mobile phone to display a screen corresponding to the button. Considering that there may be a plurality of AI function entries on the AI function entry screen, to further facilitate use by the user, operations such as sliding leftward, sliding rightward, and sliding upward in an area in which the button 207 is located may be further defined, to separately trigger different AI functions.

Figure 3B:
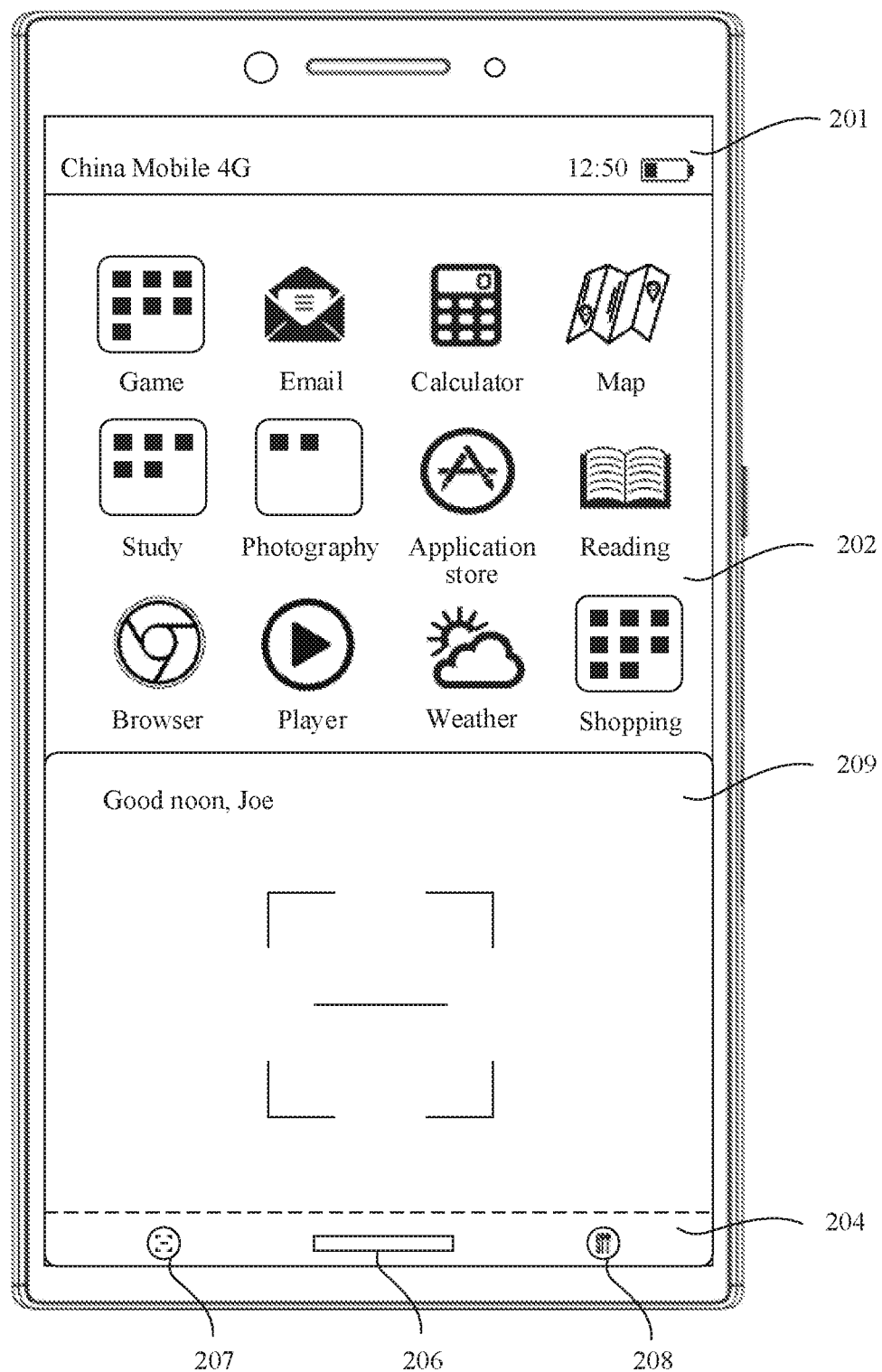
FIG. 3(b) is a third schematic diagram of a display screen according to an embodiment of the present invention.
Figure 4B:
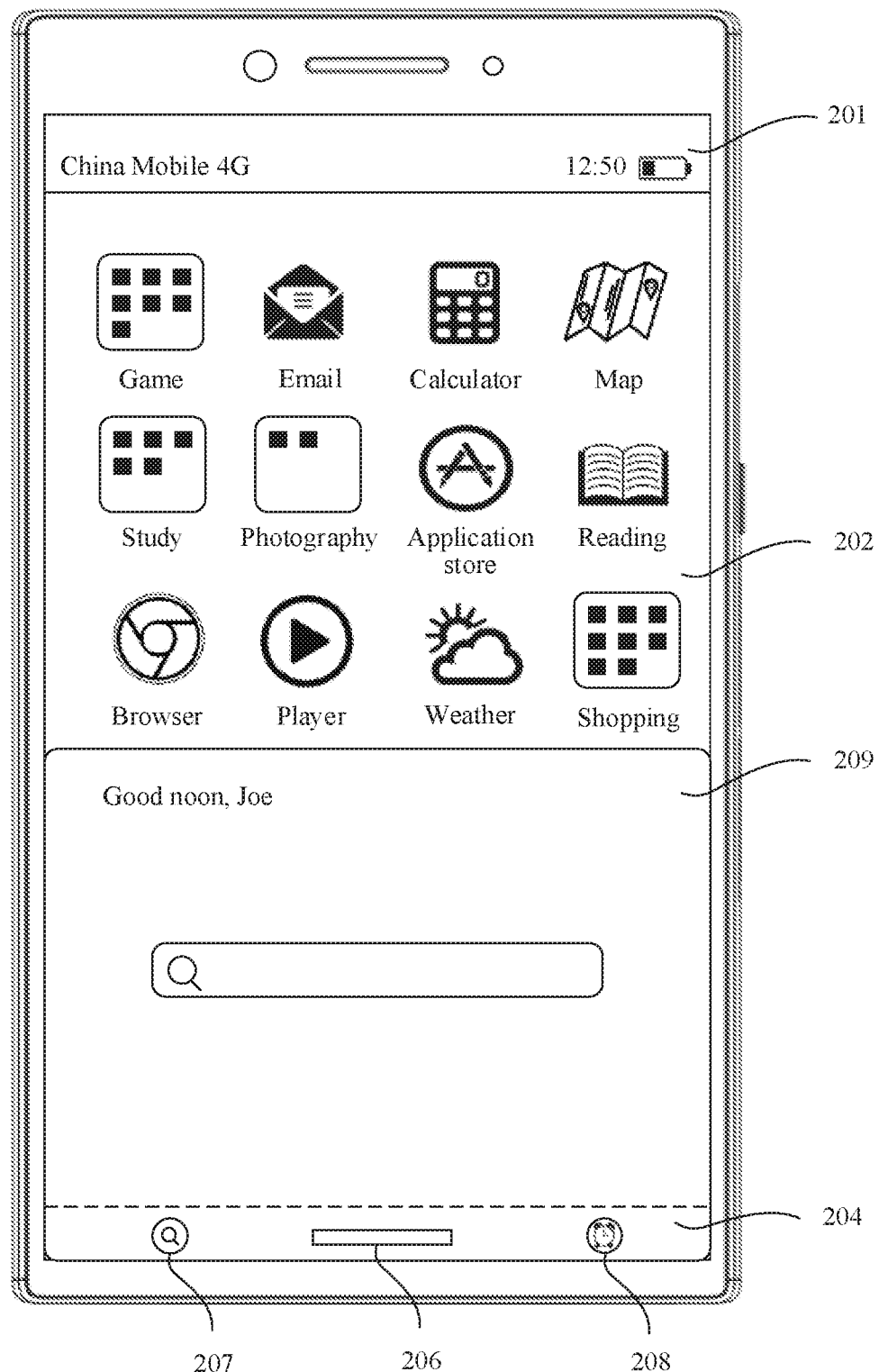
FIG. 4(b) is a fourth schematic diagram of a display screen according to an embodiment of the present invention.
Figure 5B:
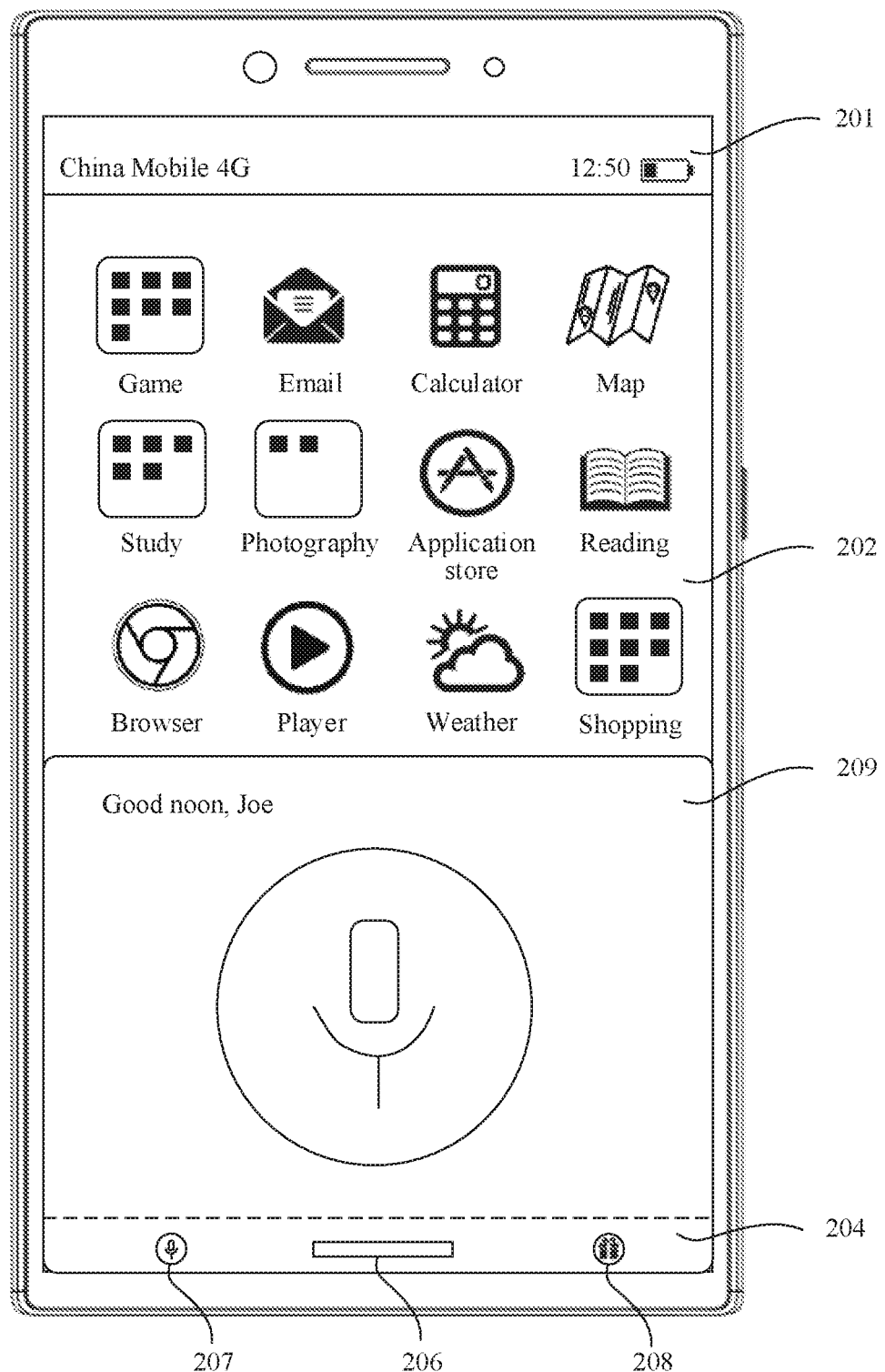
FIG. 5(b) is a fifth schematic diagram of a display screen according to an embodiment of the present invention.

For example, FIG. 2(a) is used as an example. After the user slides leftward in the area in which the button 207 is located, a floating window shown in FIG. 3(b) is displayed. That is, invoking of the scanning function by the user in one tap is implemented. After the user slides rightward in the area in which the button 207 is located, a floating window shown in FIG. 4(b) is displayed. That is, invoking of the search function by the user in one tap is implemented. After the user slides upward in the area in which the button 207 is located, a floating window shown in FIG. 5(b) is displayed, that is, invoking of the voice input function by the user in one tap is implemented. It should be noted that the foregoing operation manner is used as a possible example, and is not intended to limit the embodiments of the present invention.

When the button 210 is disposed, the user may act on the button 210 in a manner such as tapping, double tapping, touching and holding, or pressing, to trigger the mobile phone to display a screen corresponding to the button, that is, the AI function entry screen and the scene service screen. To distinguish the foregoing two functions, operations such as sliding leftward or sliding rightward in an area in which the button 210 is located may be further defined, to separately trigger different functions.

For example, a case shown in FIG. 6(a) or FIG. 6(b) is used as an example. After the user slides leftward in the area in Which the button 210 is located, a floating window is displayed. That is, invoking of the AI function entry screen by the user in one tap is implemented. After sliding rightward in the area in which the button 210 is located, the user switches the current display screen to a screen corresponding to the scene service task. That is, invoking of the scene service task screen by the user in one tap is implemented. It can be learned that, when two functions are triggered by setting a single button, the user may choose to invoke one function or two functions. In addition, when the user attempts to invoke one function, the user may selectively invoke different functions by using different operations. It should be noted that the foregoing operation manner is used as a possible example, and is not intended to limit the embodiments of the present invention.

Figure 7:
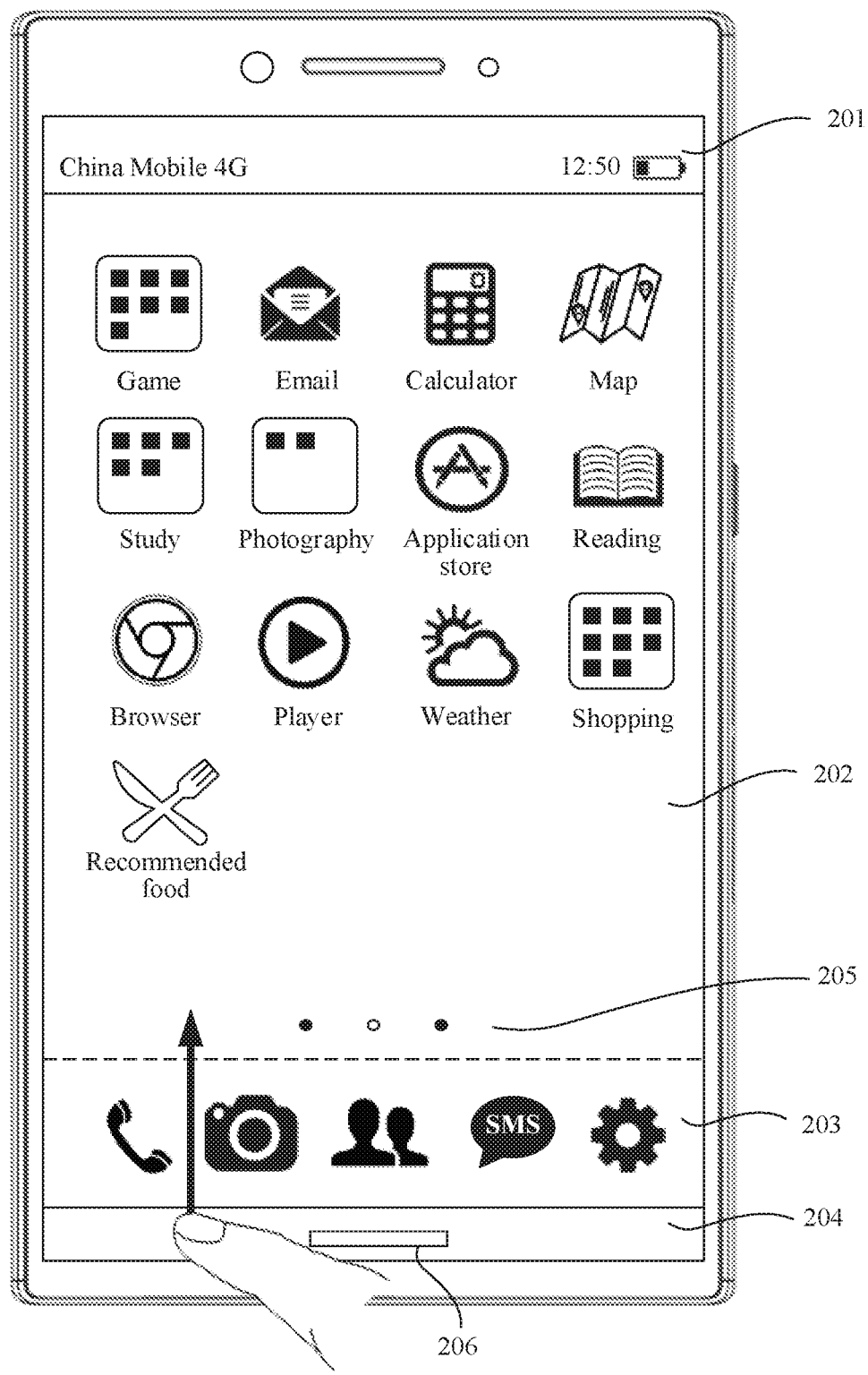
FIG. 7 is an eighth schematic diagram of a display screen according to an embodiment of the present invention.

As shown in FIG. 7, to ensure that the navigation bar 204 is neat and aesthetic, a button other than the navigation button 206 may not further be disposed in the navigation bar 204. Instead, screen switching is implemented after the user acts on the navigation bar 204, for example, after the user slides upward, to display the AI function entry and scene service tasks. Certainly, an upward or downward sliding operation performed by using the page marker 205 as a start point of the sliding operation may be preset as a manner of invoking the mobile phone to display the AI function entry and/or the scene service task, or the like. For example, the page marker 205 is used as the start point of the sliding operation. If the user performs the upward sliding operation, a floating window is displayed, showing the AI function entry. If the user performs a downward sliding operation, the current display screen is switched to a screen corresponding to the scene service task, and the scene service tasks are invoked. If the user performs a touch and hold operation, the current display screen is switched to a screen corresponding to the scene service tasks, and a floating window is presented above the screen, to display the AI function entry screen, or to simultaneously display, on the current display screen, the AI function entry screen and the scene service task screen after the screen switching is implemented. It can be learned that the foregoing example is a possible implementation, and is not intended to limit the embodiments of the present invention.

The following describes a displayed AI function entry and/or a displayed scene service task with reference to a specific application scene.

Figure 8A:
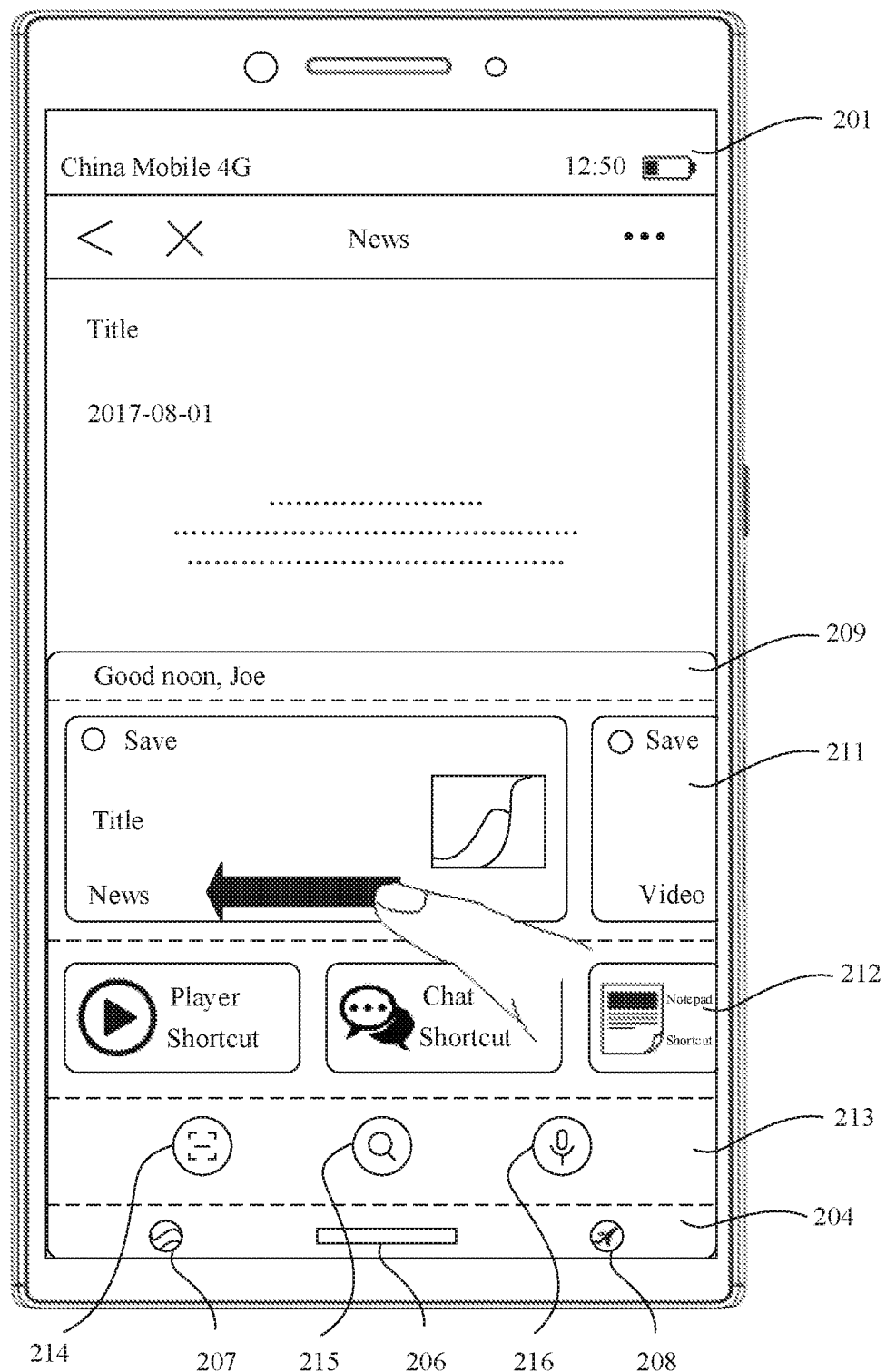
FIG. 8(a) is a fifth schematic diagram of a display screen according to an embodiment of the present invention.

The case shown in FIG. 2(a) or FIG. 2(b) is used as an example. That is, two buttons, the button 207 and the button 208, in addition to the navigation button 206 are disposed in the navigation bar 204. For other buttons that have different settings, corresponding functions are the same, and details are not described again. If news is currently displayed on the mobile phone, after the user taps the button 207, the mobile phone presents, to the user, a screen corresponding to the button 207, For example, as shown in FIG. 8(a), a floating window 209 is displayed in a current news screen. The floating window 209 partially covers the current news screen, and is configured to present the AI function entry to the user. In the embodiments of the present invention, the AI function includes at least one of the voice input function, the scanning function, the search function, the screen recognition function, a shortcut of an application program function, and an applet.

The floating window 209 shown in FIG. 8(a) includes an area in which a large card 211 is located, an area in which a small card 212 is located, and an area 213 in which a fixed AI function entry is located. The one or more large cards 211 may present, to the user, a recognition result obtained after the current display screen is recognized by using the screen recognition function, and content that has an association relationship with the recognition result. The one or more small cards 212 may present, to the user, a shortcut of an application program that has an association relationship with the identification result, a shortcut of an application program function, or an applet. This is not limited herein. The area 213 in which the fixed AI function entry is located may include at least one of a shortcut button 214 of the scanning function, a shortcut button 215 of the search function, and a shortcut button 216 of the voice input function. The user may tap the button 214 to trigger recognition of a graphic such as a two-dimensional code or a bar code. The user may tap the button 215 to trigger a search for content such as a text or a picture. The user may tap the button 216 to access an entry for entering a voice instruction.

The screen recognition function refers to that content presented on the current display screen may be recognized in a screen recognition manner. Specifically, a keyword, a key phrase, and the like that exist on the current display screen may be extracted and recognized based on semantics, then content such as an application program, an application program function, or a link corresponding to the keyword and the key phrase is found in a manner such as label matching, and a card is generated and presented to the user based on the foregoing content. The label matching refers to a correspondence between the keyword or the key phrase and an existing application program, or a correspondence between the keyword or the key phrase and an existing application program function, or a link that is found in a manner such as web page search and that is corresponding to content associated with the keyword or a key phrase. This is not limited herein. The foregoing correspondences may be preset by the user, or may be determined based on a matching relationship stored in a database and a central console. This is not limited herein.

From an implementation perspective, after information such as the keyword and the key phrase is obtained by using the screen recognition function, the obtained information may be sent to each application program, and each application program determines whether a matching relationship with the information such as the keyword and the key phrase is satisfied. If the matching relationship is satisfied, an application program may be automatically pushed to the mobile phone, the mobile phone generates a shortcut of the application program and then presents the shortcut. Similarly, the application program function, the applet, and the like may further be implemented in a same manner. This is not limited herein. After the key phrase is obtained, search results in the form of key phrases/titles and links are presented by performing an automatic network search. For example, current news is about an unmanned driving technology, and the mobile phone may automatically present, in a screen in a form of a card or a link, other news a related technical document, a picture, a report, and the like that are found about unmanned driving, for the user to invoke and read.

In this embodiment of the present invention, the large card 211 may present, to the user, a link of news presented on the current display screen. The user may tap the large card 211 to save the link to a preset location. For example, the preset location may be a part or all of an area of a current floating screen, or HiBoard (HIBOARD) or another location of the mobile phone. That is, the link is saved in a form of a card on the HiBoard of the mobile phone, and then the user may open, in a screen corresponding to the HiBoard, the link and continue browsing content corresponding to the link. The HiBoard may be considered as a screen of a multi-function set that is convenient for the user to perform operations, so that the user can obtain a corresponding service and content without opening an application program. To present content recorded in the card to the user more intuitively, content such as a category and a digest of the content recorded in the large card 210 is selectively presented to the user in the large card 211. This is not limited herein. Certainly, the user may directly open, by tapping, double tapping, touching and holding, or another operation, an application program, an application program function, an applet, or a link corresponding to the large card 211, to view related content.

In addition, the small card 212 may present, to the user, a shortcut or an applet of an application program function related to a current screen recognition result. FIG. 8(a) is used as an example. The user may tap a player card to open a player shortcut, to search for a video related to current news; tap a chat shortcut to share or discuss content of the current news; or tap a Notepad shortcut to record important content and the like in the current news. For the mobile phone, with reference to the current screen recognition result, it is considered that shortcuts of application programs such as a player, a chat, and a Notepad are closely correlated to the news. Therefore, such small cards are generated and pushed to the user. It should be noted that the correlation may be preset by the user. For example, a shortcut of an application program corresponding to a particular or a particular type of keyword and key phrase is set. This is not limited herein. When a shortcut or an applet in the small card is opened, content of the shortcut or the applet may be displayed in a current screen without jumping to another screen, or may be displayed on a screen corresponding to an opened application program of the shortcut or the applet that is jumped to. The user may set or modify an open mode.

Figure 8B:
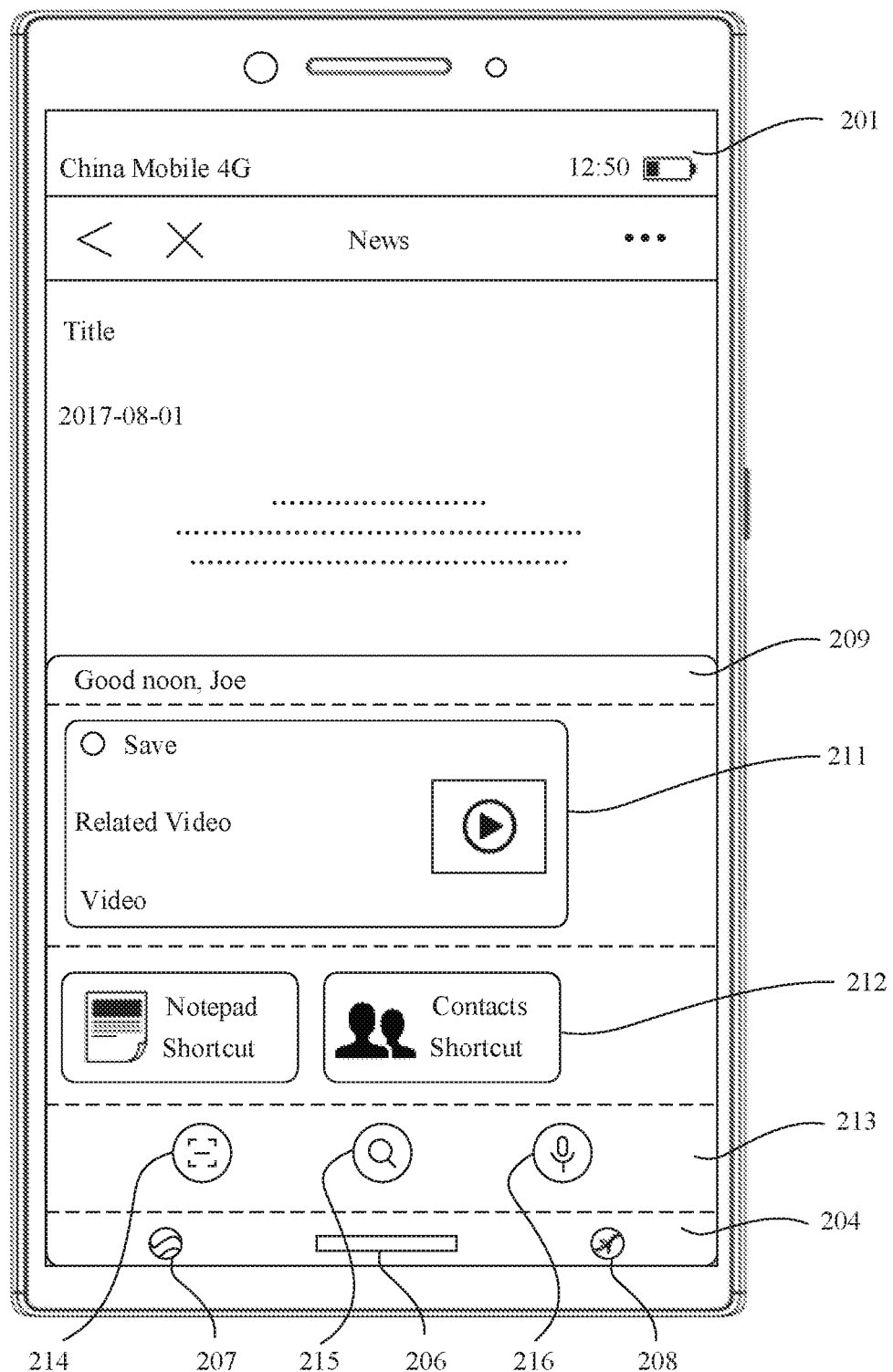
FIG. 8(b) is a sixth schematic diagram of a display screen according to an embodiment of the present invention.

It should be noted that, considering that a size of the floating window 209 is limited, that is, content presented to the user is limited, in this embodiment of the present invention, the user may slide leftward, rightward, or upward and downward in the floating window 209 by using a sliding operation, so that some or all content in the floating window 209 is selectively presented. For example, the user slides in a sliding direction shown in FIG. 8(a), to obtain content shown in FIG. 8(b).

Considering that the scanning function, the search function, and the voice input function are relatively common AI functions, and usually do not change with a scene, in this embodiment of the present invention, a button used to trigger the foregoing AI functions may be fixedly displayed in the floating window. That is, once positions of the button 214, the button 215, and the button 216 are determined, the positions may not change with a scene. That is, when the user slides in the floating window 209, the positions of the foregoing three buttons do not change. For the large card 211 and the small card 212, the foregoing sliding operation may enable the large card 211 and the small card 212 to slide at the same time.

Certainly, the large card 211 and the small card 212 may be located in different areas, so that content presented in the floating window 209 is divided into a plurality of display windows, and the user may perform an operation on each display window separately. For example, the user slides in an area in which the large card 211 is located to control sliding leftward and rightward of the large card 211. The user slides in an area in which the small card 212 is located to control sliding leftward and rightward of the small card 212. Certainly, the foregoing example is a possible implementation, and is not intended to limit this embodiment of the present invention.

The user may act on the button 207 to invoke the scanning function, the search function, and the voice input function, and the user does not need to perform a plurality of operations to locate each of the foregoing buttons. In addition, for a user unfamiliar with an operation of the mobile phone or has a relatively poor learning capability, a trigger button of each of the foregoing AI functions can be conveniently invoked, so that the user implements the foregoing functions.

In addition to the foregoing example scene in which the user views news, when the user is in another scene, the floating window 209 may present, to the user, content that is determined based on the scene and that is pushed to the user.

In this embodiment of the present invention, content of the AI function entry screen may be related to an application program, may be related to content presented on the current display screen, may be related to an application program and content presented on the current display screen, or the like. This is not limited herein.

For example, when the user uses a social application program such as WeChat, QQ, or SMS message, if the user invokes an AI function entry, appropriate content may be pushed to the user based on content presented in a current information exchange screen, that is, a chat screen. In this case, content such as a text, picture information, and a voice that are of a place exists in a dialog window. The mobile phone may recognize, by using the screen recognition function, the place recorded in the text or the place corresponding to a scene presented in the picture information, or extract related information such as a location name from the voice in a speech recognition manner. Then, based on the place, the mobile phone searches for the place within a time limit, to determine content corresponding to the place, for example, a location of the place, a transport mode for arriving at the place, and a consumption level of the place. Then, based on the determined content, an application program, an application program function, and the like that match the determined content are selected, to push, to the user, a shortcut of an application program having a group buying function, a shortcut of an application program having a car hailing function, and the like. It should be noted that, in the foregoing analysis processing and push process, only content presented on the current display screen may be alternatively considered. That is, regardless of a type of an application program, the mobile phone directly completes screen recognition based on the content presented on the current display screen, to implement content search and push. Similarly, the mobile phone may further complete the foregoing operations based on the application program and the content presented in the current screen. Details are not described herein again.

Using the foregoing social application program as an example, in response to a received preset operation of the user on a first button on the navigation bar of a first application screen, first recommended information may be further displayed in an input box of the first application screen. The first recommended information is determined by AI based on one or more display objects on the first application screen. The display object is at least one piece of text information, voice information, or image information.

In other words, for the user, in the chat screen, the mobile phone may implement a processing operation such as a semantic analysis based on the content presented in the chat screen, for example, a context of dialog content, to recommend, to the user, the first recommended information that may be used by the user. For example, the first recommended information may be content that the user expects to enter in the input box, to reply to a peer user in the chat screen. In this way, the user may directly select, from the first recommended information, the content that the user expects to enter in the input box. In this way, an operation of input of information such as a text or a voice to reply to the peer user is omitted. Especially, for a device such as a mobile phone that has a relatively small presentation proportion of an input keyboard and is inconvenient for a user to enter, in the foregoing manner of presenting the first recommended information for selection by the user, information such as chat content and reply content may be effectively recommended to the user, thereby facilitating input on a device such as a mobile phone.

With reference to the foregoing case in which the first recommended information is displayed in the input box, the first recommended information may be alternatively displayed on the first application screen in a floating manner. For example, as shown in FIG. 8(*a*) and FIG. 8(*b*), the first application screen may be further modified, and the first recommended information is displayed on the modified first application screen. For example, the first application screen is scaled, scaled content is displayed above the current display screen, and then the first recommended information is displayed below the current display screen. For another example, a partial screen of the first application screen is displayed above the current display screen, and then the first recommended information is displayed below the current display screen. The foregoing two presentation manners are used as examples, and are not intended to limit this embodiment of the present invention. Certainly, that the first application screen is modified includes but is not limited to selecting some content on the first application screen, adjusting some content on the first application screen, or the like.

For another example, in a process in which the user is watching a video, if the user invokes the AI function entry, to avoid affecting the process in which the user watches the video, the first recommended information and the video being played may be displayed on split areas of a screen. To be specific, a video window currently being played is scaled, and occupies most areas on the current display screen when being presented, and a remaining small part of areas on the current display screen may be used to display the first recommended information. The mobile phone may determine information such as a type and a name of a current video by using the screen recognition function, and then push related content of the video, that is, the first recommended information, to the user based on the information. For example, if the mobile phone identifies that the video is a promo video of a movie that has been shown, the mobile phone may push, to the user, a shortcut of an application program that has a ticket purchasing function, and cinema information of the movie that has been shown, for example, a cinema location, a ticket price, and a movie play time. In this case, the user may directly tap the shortcut to select a cinema and complete a ticket purchase operation. From the user's perspective, the foregoing push manner may further help the user learn of related information of the movie corresponding to the video currently watched, for example, movie comment information.

For another example, in a photographing process of the user, if the user invokes the AI function entry, the mobile phone may push related content, that is, the first recommended information, to the user based on content in a preview image. To ensure an imaging effect, in this embodiment of the present invention, the first recommended information may be displayed on the current application screen in a floating manner. The content in the preview image includes but is not limited to at least one of a text, a scene, food, and a task. For example, if the content in the image is the Great Wall, the mobile phone may push, to the user, historical information related to the Great Wall, for example, an origin and establishment time of the Great Wall. Certainly, considering that the Great Wall is one of the famous scenic spots, the mobile phone may further push related information of other famous scenic spots such as the Thirteen Ling to the user for reference.

The foregoing photographing process is used as an example. If the mobile phone identifies that the mobile phone is currently always in a preview image phase, it may be considered that the user currently has a photographing trend, but has not completed photographing. In this case, to enable the user to shoot a relatively good image, the mobile phone may provide a photography skill prompt for the user. Content of the photography skill prompt includes but is not limited to at least one piece of content such as a position and a posture of a photographed person, a depth of field during framing, a time of pressing a shutter, and a selected filter mode. The filter mode includes but is not limited to one of modes such as a portrait mode, a macro mode, and a motion mode.

The foregoing displayed information may be extracted from content saved/favorite by the user, or may be obtained from the Internet. For example, the mobile phone may preferentially obtain, from the content saved/favorite by the user, and display information related to an object on a current viewfinder screen. When the content saved/favorite by the use does not include the related information, the mobile phone obtains the related information through search on the Internet. Alternatively, the mobile phone may obtain the related information from both content saved/favorite/browsed by the user and the Internet, and then present all the related information on the display screen, or present information specified by the user based on a user selection.

The content saved/favorite/browsed by the user may be saved inside a current terminal, that is, content locally saved in the mobile phone that is currently operated by the user, content saved in another terminal by using a same account, content saved in a cloud, or the like. This is not limited herein. The content browsed by the user may be saved in terminals, or may be saved as content in servers, or may be a user's Internet access history, or the like. A server is one of the electronic devices mentioned in this specification.

For another example, in a process in which the user plays a game by using the mobile phone, if the user invokes the AI function entry, the mobile phone may push related content to the user based on a currently presented game screen. For example, a role introduction screen is currently displayed. In this case, the mobile phone may identify information about the role by using the screen recognition manner, then find, from a network side in a manner of searching and the like, content such as an operation manner of the role, a status that another player configures for the role, and a battle formation to which the role is adaptive, and then push the content to the user. The content may be specifically presented in a form of the large card, the small card, or the like. To help the user quickly learn of the operation manner of the role, the mobile phone may further push an operation video of a splendid gamer to the user for viewing, or the like.

For another example, in a process in which the user plays music, if the user invokes the AI function entry, the mobile phone may push a creation background of the music, a music list similar to the music style, other works of the music singer, and the like to the user. For another example, when the user views a picture, if the user invokes the AI function entry, the mobile phone may push several application programs with a relatively good picture processing effect to the user, and identify a photographing location of the picture, to provide related information of the photographing location for the user. For another example, in a process in which the user uses navigation, if the user invokes the AI function entry, the mobile phone may push a shortcut of another navigation software already installed in the mobile phone to the user.

It should be noted that if the first recommended information is a web address link, content presented to the user after the user invokes the AI function entry screen includes the web address link. In this case, after the user performs a preset operation such as tapping or sliding on the web address link, the mobile phone displays, on the current display screen, that is, on the first application screen, and in response to the preset operation of the user on the web address link, content to Which the web address link is directed.

It can be learned that, based on different scenes, the AI function entry may generate diversified change forms, to provide a better service for the user.

The case shown in FIG. 2(a) or FIG. 2(b) is used as an example. That is, two buttons, the button 207 and the button 208, in addition to the navigation button 206 are disposed in the navigation bar 204. If the user acts on the button 208, the mobile phone presents, to the user, a screen corresponding to the button 208, for example, as shown in FIG. 9.

Figure 9:
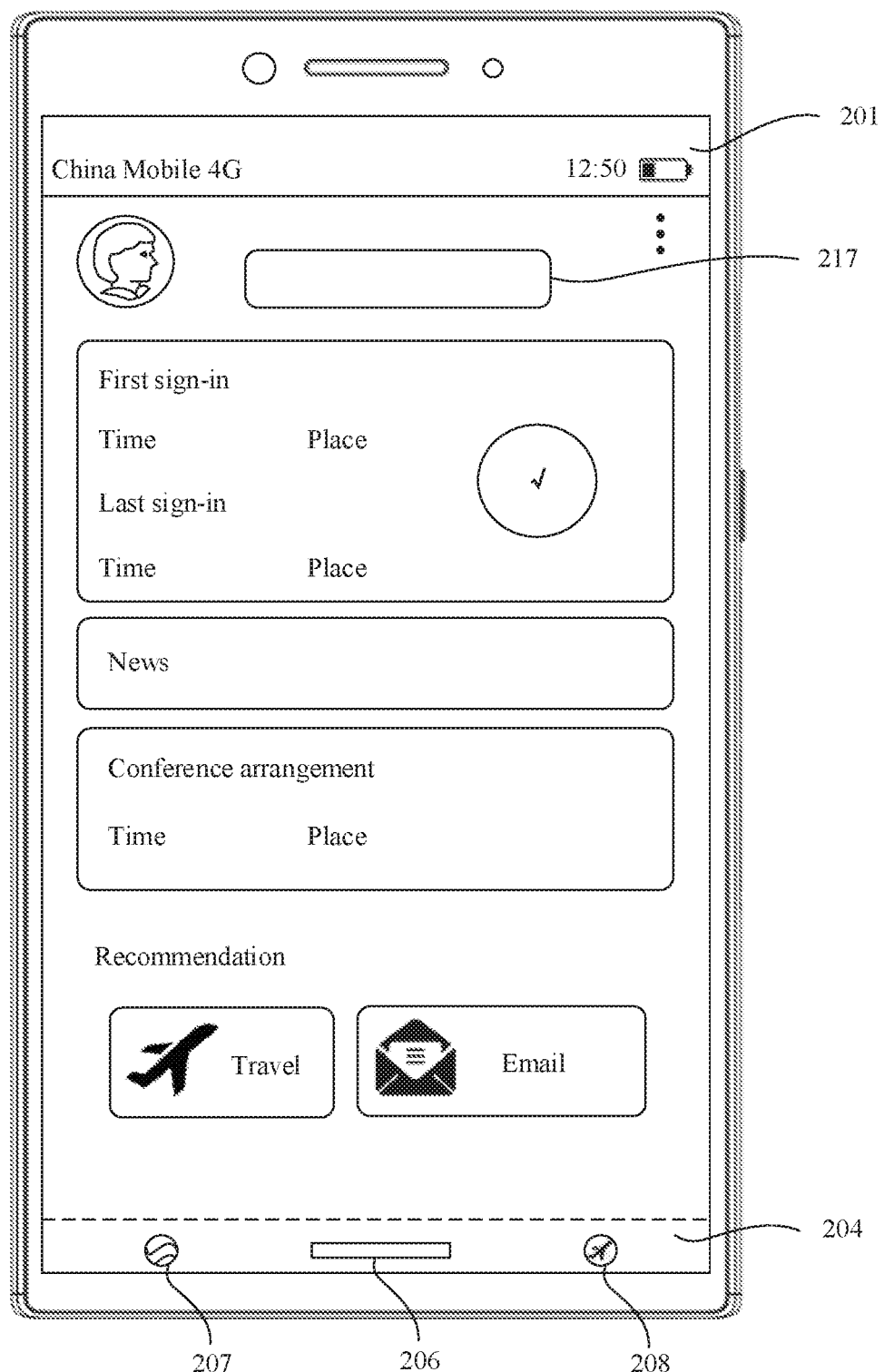
FIG. 9 is a seventh schematic diagram of a display screen according to an embodiment of the present invention.

The display screen shown in FIG. 9 includes the status bar 201, the navigation bar 204, and location information 217. The location information 217 is a current location that is of the user and that is determined by the mobile phone based on a current scene by using a positioning function or the like. For example, the location information may be "close to an office area". In this case, content presented by the mobile phone to the user includes but is not limited to office-related content, and content usually accessed by the user when the user approaches the office area in a time range of 12:50, for example, a sign-in card, a news card, and a conference arrangement card. From the user's perspective, in a lunch break time, that is, the time range of 12:50, the user usually accesses a news application program and views a conference schedule, and when the user is near the office area, the user usually signs in. Therefore, in this embodiment of the present invention, the mobile phone pushes the foregoing content or application/applet to the user based on a location of the user, a time, and a daily behavior habit of the user. The applet is a special application program that can be used without being downloaded and installed, and the user can open the application program through scanning or searching. The user does not need to care about whether too many application programs are installed. Application programs will be ubiquitous and available at any time, and there is no need to install or uninstall the application programs.

Take the sign-in card as an example. The user usually needs to open an application program with a sign-in function in a tapping manner or the like, to complete a sign-in operation. In this embodiment of the present invention, there is the sign-in card on the scene service task screen, and the user may sign in on the sign-in card in a tapping manner or the like. In this case, the user does not need to again open the application program having the sign-in function. The sign-in card may be considered as being implemented by using an address link. That is, although the tap operation of the user is currently performed on the sign-in card, the tap operation can be directly linked to the application program having the sign-in function, so that the tap operation performed by the user on the sign-in card is equivalent to the sign-in operation performed by the user after the user opens the application program with the sign-in function.

In addition, the mobile phone may selectively present a recommended small card to the user. For example, if the user currently has an untraveled air ticket, or a current meeting schedule of the user may be inconsistent with a city in which the user is currently located, the mobile phone may recommend a travel small card to the user. A function of the travel small card may be to provide the user with services such as air ticket purchase and seat selection. Similarly, considering that the user is near the office area, and the user usually runs an email application program when the user is in the office area, the mobile phone may push an email small card to the user. A function of the email small card may be to enable the user to receive and reply to an email in real time, or the like. It should be noted that the foregoing content presented to the user is a possible example, and is not intended to limit this embodiment of the present invention.

A scene-based service may change with a scene. Therefore, in this embodiment of the present invention, if a preset condition is met, the mobile phone may update the scene service task.

For example, if the preset condition is that the current time is within a preset time range, the mobile phone replaces the scene service task with a scene service task that matches an event corresponding to the preset time range. The mobile phone may update the scene service task based on a time point or a time period of a daily habit that the user accesses an application program. For example, if the user usually reads news from 8:00 to 10:00 in the morning, in a time period from 8:00 to 10:00, the mobile phone may push a shortcut of an application program used to view news to the scene service task.

For another example, if the preset condition is that the current location is in a preset location range, the mobile phone replaces the scene service task with a scene service task that matches an event corresponding to the preset location range. The mobile phone pushes the scene service task to the user based on the current location of the user and a place in content such as schedule arrangement and the reminded event of the user. For example, if there is an air ticket that has not been used, and it is displayed in the schedule arrangement that the air ticket needs to be used today, the scene service task may provide, based on the current location of the user and a location of an airport, the user with content such as a navigation route and required route time for reference.

For another example, if the preset condition is that a current movement status is a preset movement status, the mobile phone replaces the scene service task with a scene service task that matches the preset movement status. For example, if the mobile phone identifies, by using the sensor, that a current driving speed of the user is within a driving speed range, the mobile phone may consider that the user is currently in a driving state. If the preset movement status includes the driving state, after determining that the user is in the driving state, the mobile phone may push driving-related information to the user, for example, a current driving speed and a remaining fuel amount. Optionally, the mobile phone pushes road condition information of each current route, and the like to the user, and this is not limited herein.

It should be noted that, in the foregoing enumerated possible cases, the scene service task may be pushed based on an independent preset condition or at least two preset conditions. In other words, in this embodiment of the present invention, there may be one or more types of the scene service task. This is not limited herein.

In other words, for the scene service task screen, a shortcut of a third application program is displayed at a first preset position on the scene service task screen at a first time, and a screen corresponding to the third application program is displayed on the scene service task screen in response to a received preset operation of the user on the shortcut of the third application program. A shortcut of a fourth application program is displayed at the first preset position on the scene service task screen at a second time, and a screen corresponding to the fourth application program is displayed on the scene service task screen in response to a received preset operation of the user on the shortcut of the fourth application program. The third application program and the fourth application program are determined by the electronic device based on a use habit of the user. The first time is different from the second time, and the third application program is different from the fourth application program, in this embodiment of the present invention, the foregoing update of the scene service task may better provide the user with content applicable to the current scene. With reference to the foregoing update process of the scene service task, a presentation form of the second button, that is, the button 208, may further change. For example, content corresponding to the third application program is displayed on the second button at the first time. Content corresponding to the fourth application program is displayed on the second button at the second time.

To reduce power consumption of the mobile phone, in this embodiment of the present invention, the mobile phone may not update the scene service task in real time, that is, may update the scene service task periodically or according to a fixed time period. For example, the user may set a time point for updating the scene service task in advance. Alternatively, the mobile phone updates the scene service task after a current operation of the user meets a preset triggering condition. For example, if a quantity of times that the user accesses a particular application program within a period of time exceeds a preset quantity of times, it is considered that the user may need to access the application program for a plurality of times recently. In this case, the mobile phone may set a shortcut of the application program on the scene service task for use convenience of the user. In addition, the mobile phone may update the scene service task and the like each time the user turns on the screen and/or unlocks the screen. This is not limited herein.

Figure 10:
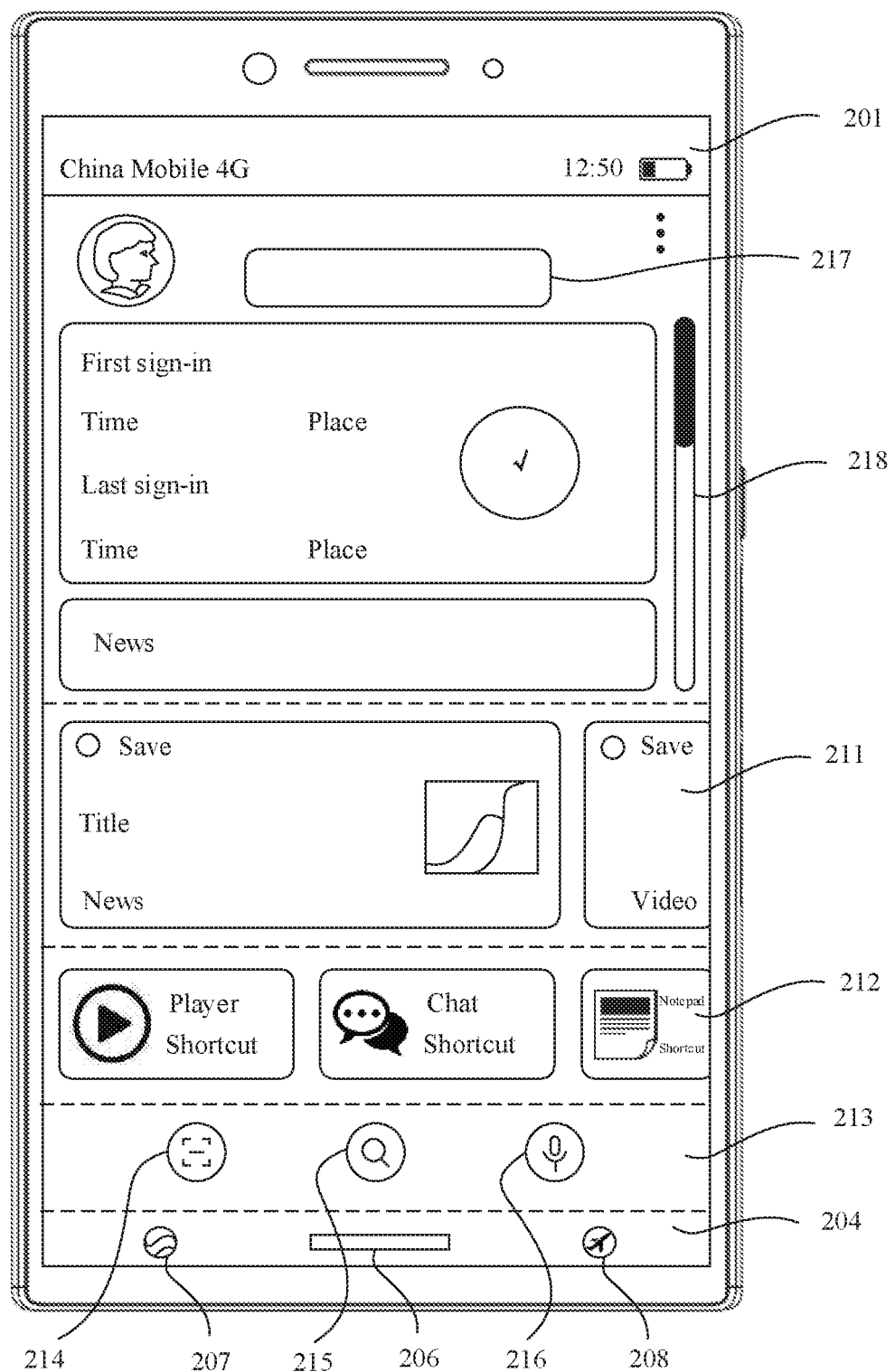
FIG. 10 is an eighth schematic diagram of a display screen according to an embodiment of the present invention.

Using a case shown in FIG. 6(*a*), FIG. 6(*b*), or FIG. 7 as an example, when the display screen is switched and a display screen including the AI function entry screen and the scene service task screen is displayed, content shown in FIG. 10 may be presented. Considering that when the AI function entry screen and the scene service task screen are presented in a same display screen, there is a high probability, that too much content needs to be presented, so that it is difficult to display all the content. Therefore, in this embodiment of the present invention, a scroll bar 218 may be further disposed on the display screen. The user may browse the scene service task by sliding the scroll bar 218. Certainly, on the current display screen, a scroll bar used to control the entire display screen may be disposed. Alternatively, a scroll bar used to control the scene service task and a scroll bar used to control the AI function entry may be separately disposed based on the two different functions. Alternatively, when no scroll bar is disposed, a sliding operation of the user is by default an operation manner of controlling a screen flipping or moving upward and downward, or leftward and rightward.

Figure 11A:
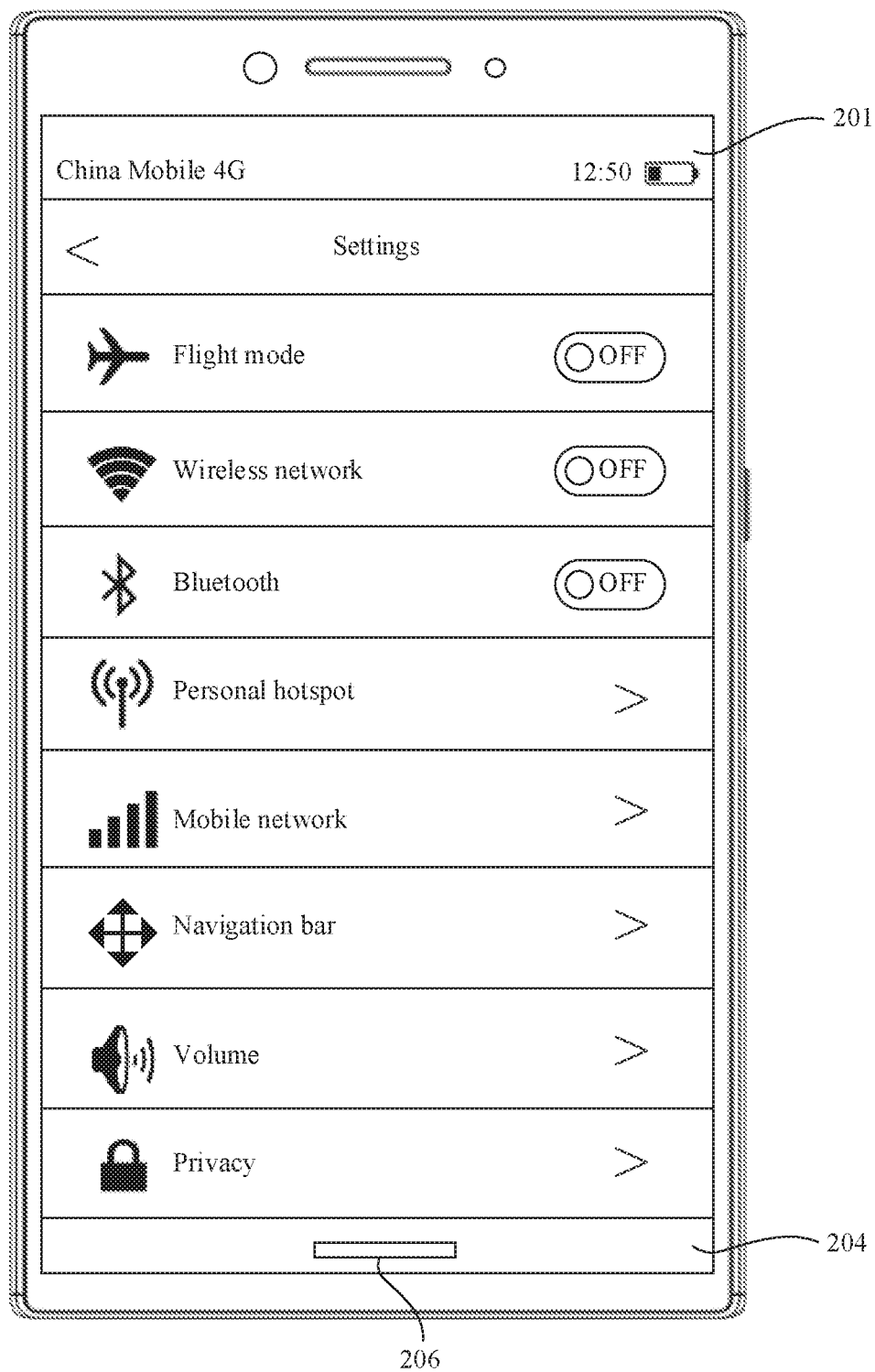
FIG. 11(a) is a ninth schematic diagram of a display screen according to an embodiment of the present invention.
Figure 11B:
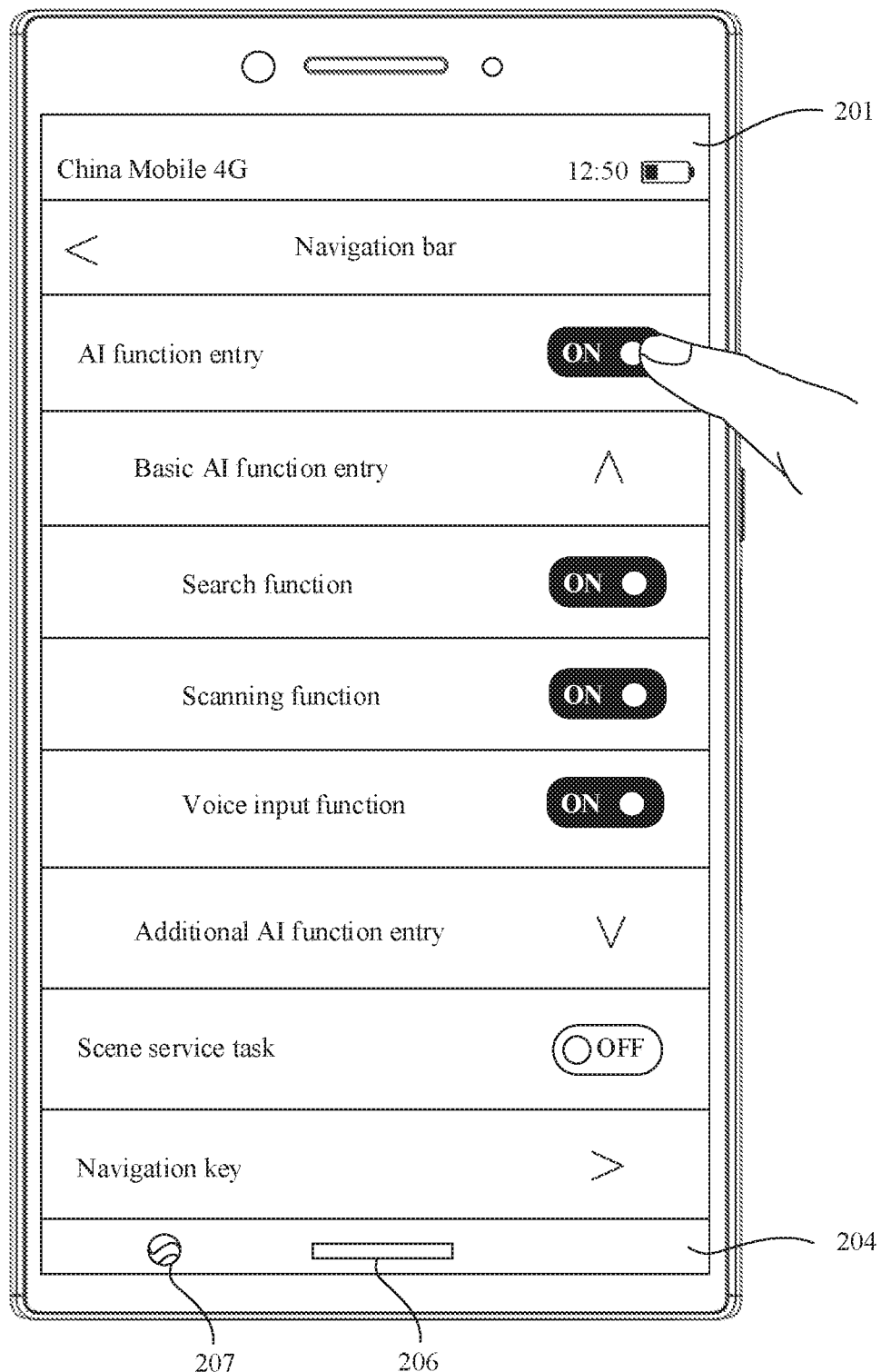
FIG. 11(b) is a tenth schematic diagram of a display screen according to an embodiment of the present invention.

From the user's perspective, a function of each of the button 207, the button 208, or the button 210 may be selectively enabled or disabled by the user. For example, a setting screen shown in FIG. 11(a) includes a setting option about the navigation bar. The user may tap and open a setting screen of the navigation bar, as shown in FIG. 11(b). On the setting screen of the navigation bar, the user may selectively enable one or more of the AI function entry and the scene service task. Certainly, the user may alternatively choose not to enable the foregoing two functions.

For example, the user enables an AI function entry. In the navigation bar 204, the button 207 is presented, so that a floating window is presented to the user after the user acts on the button 207, to enable the user to trigger AI functions. Similarly, a function of the scene service task may further be enabled on the setting screen of the navigation bar. An operation manner is similar to that of enabling the AI function entry, and details are not described herein again.

It should be noted that, a manner in which the user selectively enables buttons on the AI function entry screen and the scene service task screen is not limited to the operation manner described above, and the user may further complete a setting operation by using another screen. Certainly, when the mobile phone is delivered from a factory, the button 207, the button 208, and the navigation button 206 may alternatively be presented at the same time by default, or the button 210 and the navigation button 206 may be presented at the same time. This is not limited herein.

Similarly, from the user's perspective, when it is determined to enable the AI function entry, the user may further choose whether to enable a basic AI function. The basic AI function includes but is not limited to one or more of the search function, the scanning function, and the voice input function. Using the scanning function as an example, if the user disables the scanning function, using FIG. 10 as an example, the button 214 does not exist in the area 213 in which the fixed AI function entry is located.

A control apparatus may be disposed in the foregoing terminal. To implement the foregoing functions, the control apparatus includes corresponding hardware structures and/or software modules for performing the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

All control apparatuses in this embodiment of the present invention are configured to implement the method in the foregoing method embodiments. In this embodiment of the present invention, the control apparatus may be divided into function modules based on the foregoing method examples. For example, each function module may be divided based on each corresponding function, or two or more functions may be integrated into one processing module. The integrated module may be implemented in a form of hardware, or may be implemented in a form of a software functional module. It should be noted that, in this embodiment of the present invention, module division is exemplary, and is merely a logical function division. In actual implementation, another division manner may be used.

Figure 12:
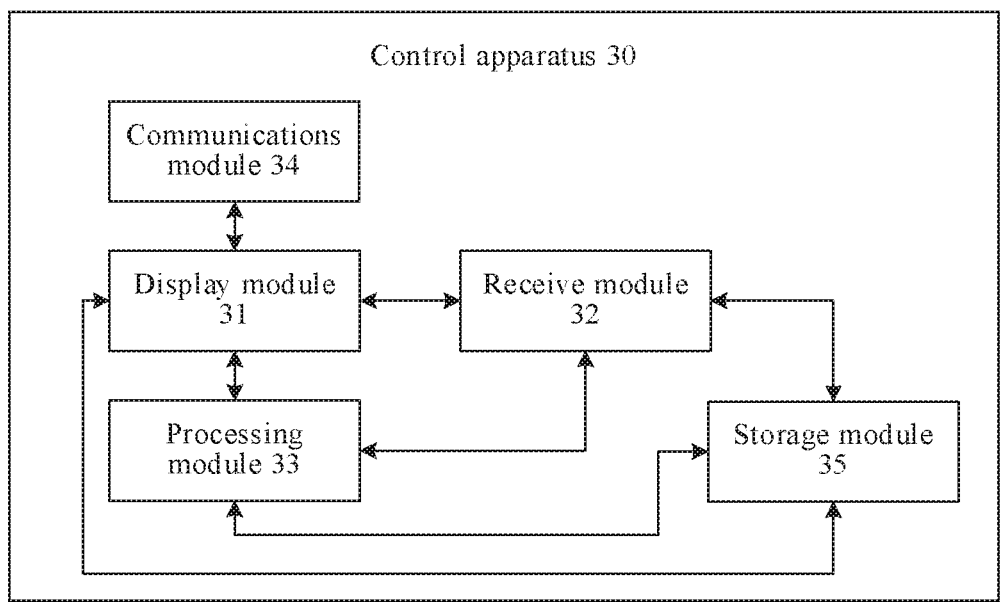
FIG. 12 is a schematic structural diagram of a control apparatus according to an embodiment of the present invention.

FIG. 12 is a possible schematic structural diagram of the control apparatus in the foregoing embodiment. The control apparatus 30 includes: a display module 31, a receive module 32, and a processing module 33. The display module 31 is configured to support the control apparatus 30 in displaying a first screen, an AI function entry screen, a service scene task screen, and a function button such as a non-navigation button such as a first button or a second button, or a navigation button in this embodiment of the present invention, and the like. The receive module 32 is configured to support the control apparatus 30 in receiving first input, second input, third input, an input operation of the user acting on any content presented in a display screen, an input operation of the user acting on a hard button, or the like. The processing module 33 is configured to support the control apparatus 30 in performing an operation such as a semantic analysis or keyword extraction on content presented on the display screen, and/or another process used for the technology described in this specification. In this embodiment of the present invention, the control apparatus 30 further includes: a communications module 34, configured to support the control apparatus 30 in performing data exchange with each module in the terminal, and/or support the terminal in communicating with another device such as a server. The storage module 35 is configured to support the control apparatus 30 in storing program code and data that are of the terminal.

The processing module 33 may be a processor or a controller, such as a central processing unit (Central Processing Unit, CPU), a general-purpose processor, a digital signal processor (Digital Signal Processing, DSP), an application-specific integrated circuit (Application-Specific Integrated Circuit, ASIC), a field programmable gate array (Field-Programmable Gate Array, FPGA), or another programmable logical device, a transistor logical device, a hardware component, or any combination thereof. The controller/processor may implement or execute example logical blocks, modules, and circuits described with reference to content disclosed in the present invention. The processor may alternatively be a combination implementing a computing function, for example, a combination including one or more microprocessors, or a combination of a DSP and a microprocessor. The communications module 34 may be implemented as a transceiver, a transceiver circuit, a communications interface, or the like. The storage module 35 may be implemented as a memory.

Figure 13:
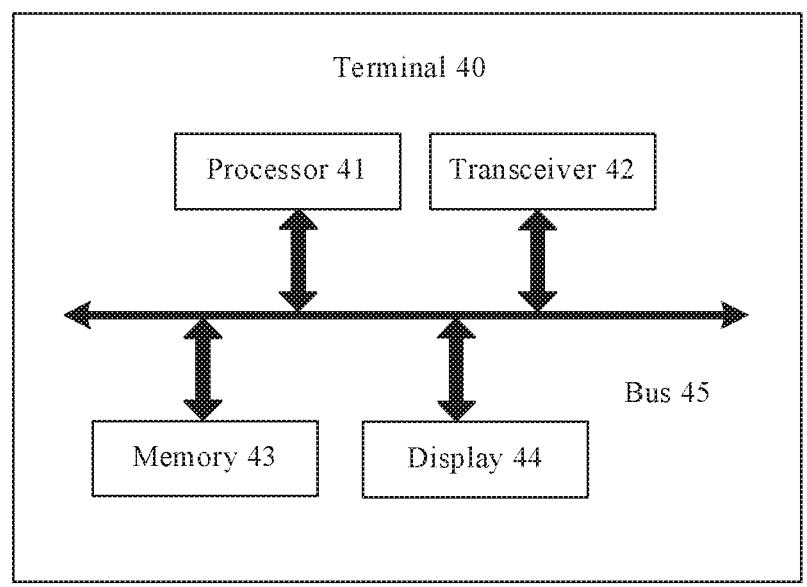
FIG. 13 is a second schematic structural diagram of a terminal according to an embodiment of the present invention.

If the display module 31 is implemented as a display, the processing module 33 is implemented as a processor, the receive module 32 and the communications module 34 are implemented as a transceiver, and the storage module 35 is implemented as a memory, as shown in FIG. 13, a terminal 40 includes: a processor 41, a transceiver 42, a memory 43, a display 44, and a bus 45. The processor 41, the transceiver 42, the memory 43, and the display 44 are connected to each other through the bus 45. The bus 45 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 13, but this does not mean that there is only one bus or only one type of bus.

Method or algorithm steps described in combination with the content disclosed in the present invention may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (Compact Disc Read-Only Memory, CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be deployed in a same device, or the processor and the storage device may be deployed in different devices as discrete components.

An embodiment of the present invention provides a chip, a module, or an apparatus, configured to implement the method in the foregoing method embodiments, and specifically instruct a display, a processor, and an input device that are connected to the foregoing control apparatus to perform functions implemented by the control method provided in the embodiments of the present invention.

An embodiment of the present invention provides a readable storage medium. The readable storage medium stores an instruction. When the instruction is run on a terminal, the terminal is enabled to perform any method according to the foregoing method embodiments.

An embodiment of the present invention provides a computer program product. The computer program product includes software code. The software code is used to perform the method according to any method according to the foregoing method embodiments.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A control method implemented by an electronic device, wherein the control method comprises:
    displaying a first interface comprising a navigation bar that comprises a navigation button and a non-navigation button;
    when the navigation button is triggered, performing at least one of:
        returning to a previous interface;
        jumping to a home interface; or
        invoking an interface of an application program accessed within a preset time up to a current moment;
    receiving a first input of a user on the non-navigation button; displaying, in response to the first input, at least one of a floating artificial intelligence (AI) function entry interface on the first interface or a scene service task interface that corresponds to the non-navigation button;
    receiving a first preset operation from the user on the non-navigation button; and
    displaying, in response to the first preset operation, first recommended information on the first interface,
    wherein the first recommended information is determined by AI based on one or more display objects displayed on the first interface.

2. The control method of claim 1, wherein the first interface is a first application interface that includes the non-navigation button, and wherein
    each of the one or more display objects is at least one piece of text information, voice information, or image information.

3. The control method of claim 2, further comprising at least one of:
    displaying the first recommended information in an input box of the first application interface;
    displaying the first recommended information on the first application interface in a floating manner; or
    modifying the first application interface to obtain a modified first application interface and displaying the first recommended information on the modified first application interface.

4. The control method of claim 2, wherein the first recommended information is at least one of a web address link, a text, a picture, or an emoticon.

5. The control method of claim 4, wherein the first recommended information is the web address link, and wherein after displaying the first recommended information, the control method further comprises:
    receiving a second preset operation from the user on the web address link; and
    displaying, on the first application interface in response to the second preset operation, content to which the web address link is directed.

6. The control method of claim 5, wherein the first application interface is a viewfinder interface, wherein the first recommended information corresponds to the one or more display objects, and wherein each of the one or more display objects is the image information.

7. The control method of claim 1, wherein displaying the at least one of the floating AI function entry interface on the first interface or the scene service task interface comprises displaying the scene service task interface, wherein the scene service task interface presents a recommended task, wherein a form of the non-navigation button corresponds to the recommended task, and wherein the control method further comprises:
    displaying a shortcut of a second application program at a first preset position on the scene service task interface at a first time, wherein the second application program is determined based on a use habit of the user;
    receiving a third preset operation from the user on the shortcut of the second application program;
    displaying, on the scene service task interface in response to the third preset operation, a second interface corresponding to the second application program;
    displaying a shortcut of a third application program at the first preset position at a second time, wherein the first time is different from the second time, and wherein the third application program is determined based on the use habit of the user and is different than the second application program;

receiving a fourth preset operation from the user on the shortcut of the third application program; and displaying, on the scene service task interface in response to the fourth preset operation, a third interface corresponding to the third application program.

8. The control method of claim 7, further comprising:

displaying, at the first time on the non-navigation button, content corresponding to the second application program; and displaying, at the second time on the non-navigation button, content corresponding to the third application program.

9. The control method of claim 1, wherein the first interface is the home interface, and wherein the first interface further comprises a dock area that comprises a shortcut of the application program.

10. An electronic device comprising:

an input device;

a display configured to display a first interface that comprises a navigation bar that comprises a navigation button and a non-navigation button; and a processor coupled to the display and the input device and configured to:

when the navigation button is triggered, perform at least one of:

returning to a previous interface;

jumping to a home interface; or invoking an interface of an application program accessed within a preset time up to a current moment;

receive, using the input device, a first input of a user on the non-navigation button;

display, using the display and in response to the first input, at least one of a floating artificial intelligence (AI) function entry interface on the first interface or a scene service task interface that corresponds to the non-navigation button;

receive a first preset operation from the user on the non-navigation button; and display, in response to the first preset operation, first recommended information on the first interface, wherein the first recommended information is determined by AI based on one or more display objects displayed on the first interface.

11. The electronic device of claim 10, wherein the first interface is a first application interface that includes the non-navigation button, and wherein each of the one or more display objects is at least one piece of text information, voice information, or image information.

12. The electronic device of claim 11, wherein the processor is further configured to:

display, using the display, the first recommended information in an input box of the first application interface;

display, using the display, the first recommended information on the first application interface in a floating manner; or modify the first application interface to obtain a modified first application interface and display, using the display, the first recommended information on the modified first application interface.

13. The electronic device of claim 11, wherein the first recommended information is at least one of a web address link, a text, a picture, or an emoticon.

14. The electronic device of claim 13, wherein the first recommended information is the web address link, and wherein the processor is further configured to:

receive, using the input device, a second preset operation from the user on the web address link; and display, using the display and on the first application interface, content to which the web address link is directed in response to the second preset operation.

15. The electronic device of claim 14, wherein the first application interface is a viewfinder interface, wherein the first recommended information corresponds to the one or more display objects displayed on the first application interface, and wherein each of the one or more display objects is the image information.

16. The electronic device of claim 10, wherein the processor is further configured to:

determine a second application program and a third application program based on a use habit of the user, wherein the second application program is different than the third application program;

display, using the display, a shortcut of the second application program at a first preset position on the scene service task interface at a first time;

receive, using the input device, a third preset operation from the user on the shortcut of the second application program;

display, using the display and on the scene service task interface, an interface corresponding to the second application program in response to the third preset operation;

display, using the display, a shortcut of the third application program at the first preset position at a second time;

receive, using the input device, a fourth preset operation from the user on the shortcut of the third application program; and display, using the display and on the scene service task interface, an interface corresponding to the third application program in response to the third preset operation.

17. The electronic device of claim 16, wherein the processor is further configured to:

display, using the display and on the non-navigation button, content corresponding to the second application program at the first time; and display, using the display and on the non-navigation button, content corresponding to the third application program at the second time.

18. The electronic device of claim 10, wherein the first interface is the home interface, wherein the first interface further comprises a dock area, and wherein the dock area holds a shortcut of the application program.

19. A computer program product comprising computer-executable instructions for storage on a non-transitory computer-readable storage medium that, executed by a processor, cause an apparatus to:

display a first interface comprising a navigation bar that comprises a navigation button and a non-navigation button;

when the navigation button is triggered, perform at least one of:

return to a previous interface;

jump to a home interface; or invoke an interface of an application program accessed within a preset time up to a current moment;

receive a first input of a user on the non-navigation button;

display, in response to the first input, at least one of a floating artificial intelligence (AI) function entry screen interface on the first interface or a scene service task screen interface that corresponds to the non-navigation button;

receive a first preset operation from the user on the non-navigation button; and display, in response to the first preset operation, first recommended information on the first interface, wherein the first recommended information is determined by AI based on one or more display objects displayed on the first interface.

20. The computer program product of claim 19, wherein the first interface is a first application interface, and wherein each of the one or more display objects is at least one piece of text information, voice information, or image information.

* * * * *